United States Patent [19]

Terashita

[11] Patent Number: 5,767,983
[45] Date of Patent: Jun. 16, 1998

[54] COLOR COPYING APPARATUS FOR DETERMINING EXPOSURE AMOUNT FROM IMAGE DATA OF AN ORIGINAL IMAGE AND A REFERENCE IMAGE

[75] Inventor: Takaaki Terashita, Kanagawa, Japan

[73] Assignee: Fuji Photo Film Co., Ltd., Kanagawa, Japan

[21] Appl. No.: 620,344

[22] Filed: Mar. 22, 1996

[30] Foreign Application Priority Data

Mar. 24, 1995 [JP] Japan ................................ 7-066557
Mar. 24, 1995 [JP] Japan ................................ 7-066558

[51] Int. Cl.$^6$ ........................... H04N 1/00; G03F 3/08; G03B 27/52; G03B 27/80
[52] U.S. Cl. ..................... 358/302; 358/518; 358/523; 355/35; 355/38; 355/77
[58] Field of Search ..................... 358/296, 298, 358/302, 406, 501, 504, 518, 523, 538; 382/162, 167, 312, 319; 347/131, 133, 139, 246, 262; 399/32, 45, 72–74, 178; 355/32, 38, 35, 54, 77

[56] References Cited

U.S. PATENT DOCUMENTS

| | | | |
|---|---|---|---|
| 4,641,959 | 2/1987 | Terashita | 355/77 |
| 5,148,213 | 9/1992 | Terashita | 355/38 |
| 5,162,841 | 11/1992 | Terashita | 355/38 |
| 5,353,095 | 10/1994 | Terashita | 355/38 |
| 5,561,494 | 10/1996 | Terashita | 355/38 |

FOREIGN PATENT DOCUMENTS

| | | | |
|---|---|---|---|
| 51-112345 | 8/1975 | Japan | G03B 27/72 |
| 54-110829 | 8/1979 | Japan | G03B 27/72 |
| 56-1039 | 1/1981 | Japan | G03B 27/73 |
| 57-211136 | 12/1982 | Japan | G03B 27/80 |
| 59-220761 | 12/1984 | Japan | G03G 15/01 |
| 61-198144 | 9/1986 | Japan | G03B 27/72 |
| 61-232442 | 10/1986 | Japan | G03B 27/72 |
| 61-267749 | 11/1986 | Japan | G03B 27/32 |
| 61-273532 | 12/1986 | Japan | G03B 27/72 |
| 62-144158 | 6/1987 | Japan | G03B 27/73 |
| 4-159534 | 6/1992 | Japan | G03B 27/72 |
| 4-319933 | 11/1992 | Japan | G03B 27/72 |

*Primary Examiner*—Eric Frahm
*Attorney, Agent, or Firm*—Sughrue, Mion, Zinn, Macpeak & Seas, PLLC

[57] ABSTRACT

A color copying apparatus for constantly obtaining a high-quality print irrespective of a change in film characteristics due to deterioration over time and the like is disclosed. A reference image recorded on the film is photometrically measured to determine film characteristic data. After logarithmically transformed values of photometric values of an original image on one film set in a printing position have been stored, normalizing conditions are determined on the basis of average image data, and a transformation formula or table for transformation between the film characteristic data and image data is generated in correspondence with a film type. Pixels are then selected from the original image set in the printing position, and a characteristic amount of the image is calculated and is made to correspond to print characteristic data by means of the transformation formula or table. An abnormal frame is then determined by using the film characteristic data and the characteristic amount of the image, and an exposure amount is determined by setting coefficients of an exposure calculating formula as a result of the determination, so as to effect exposure control.

13 Claims, 25 Drawing Sheets

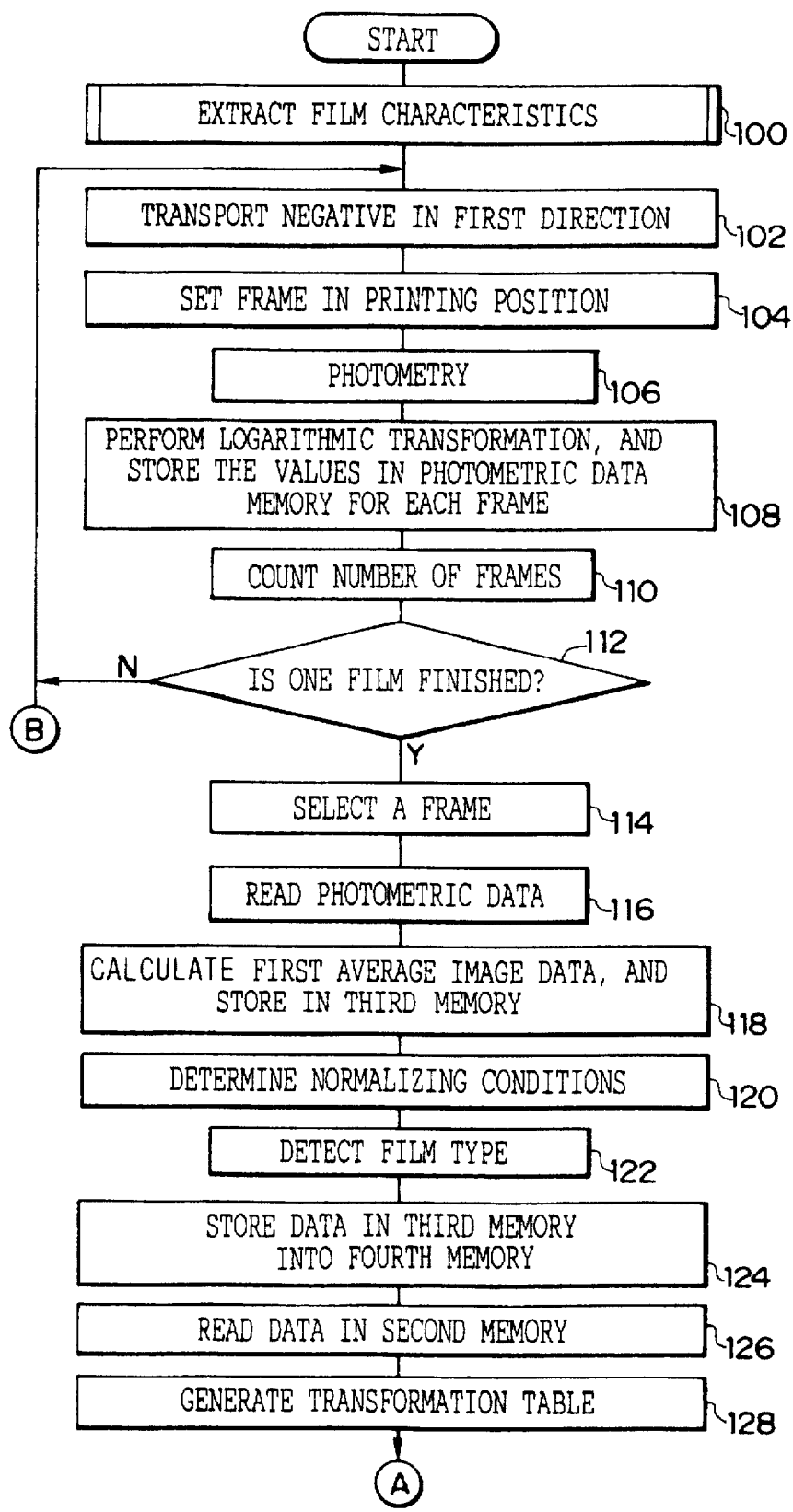

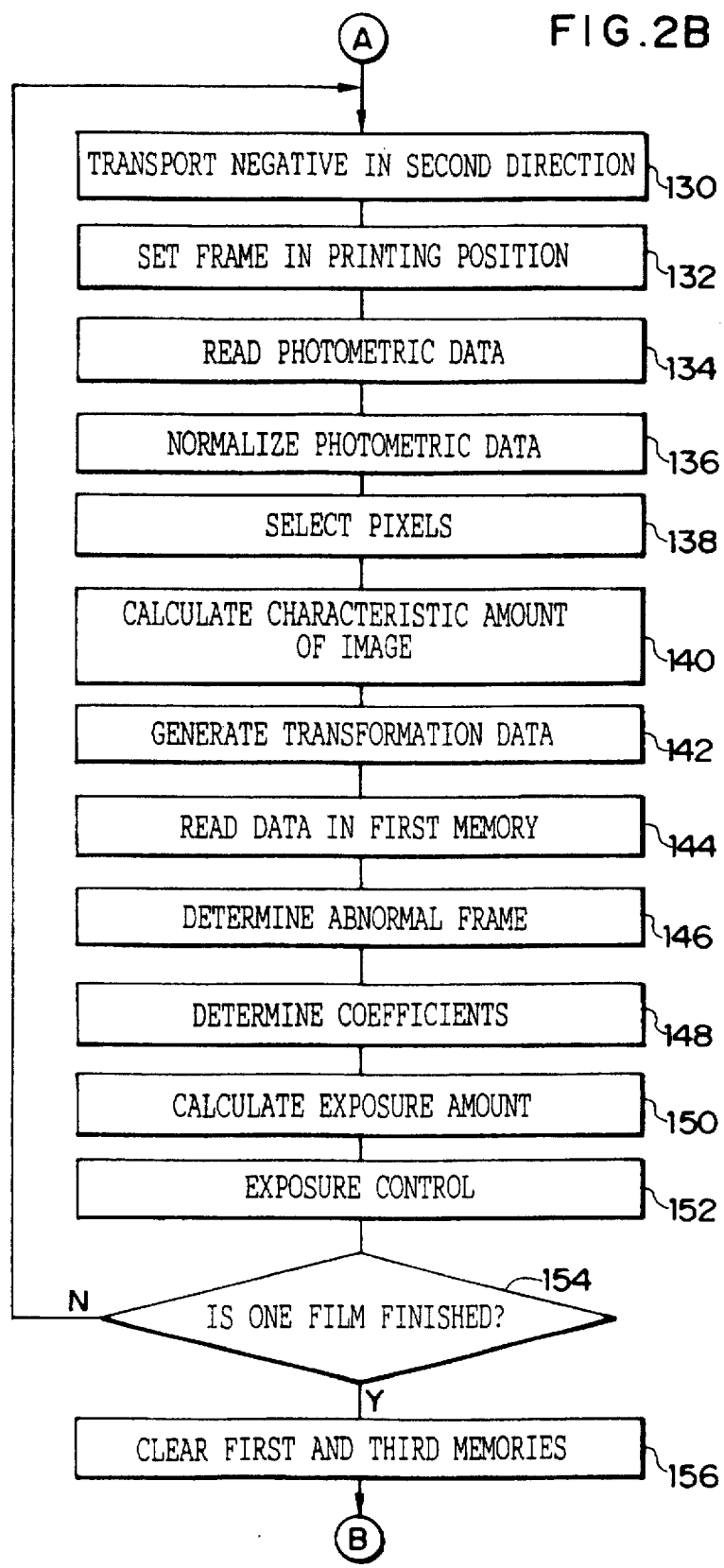

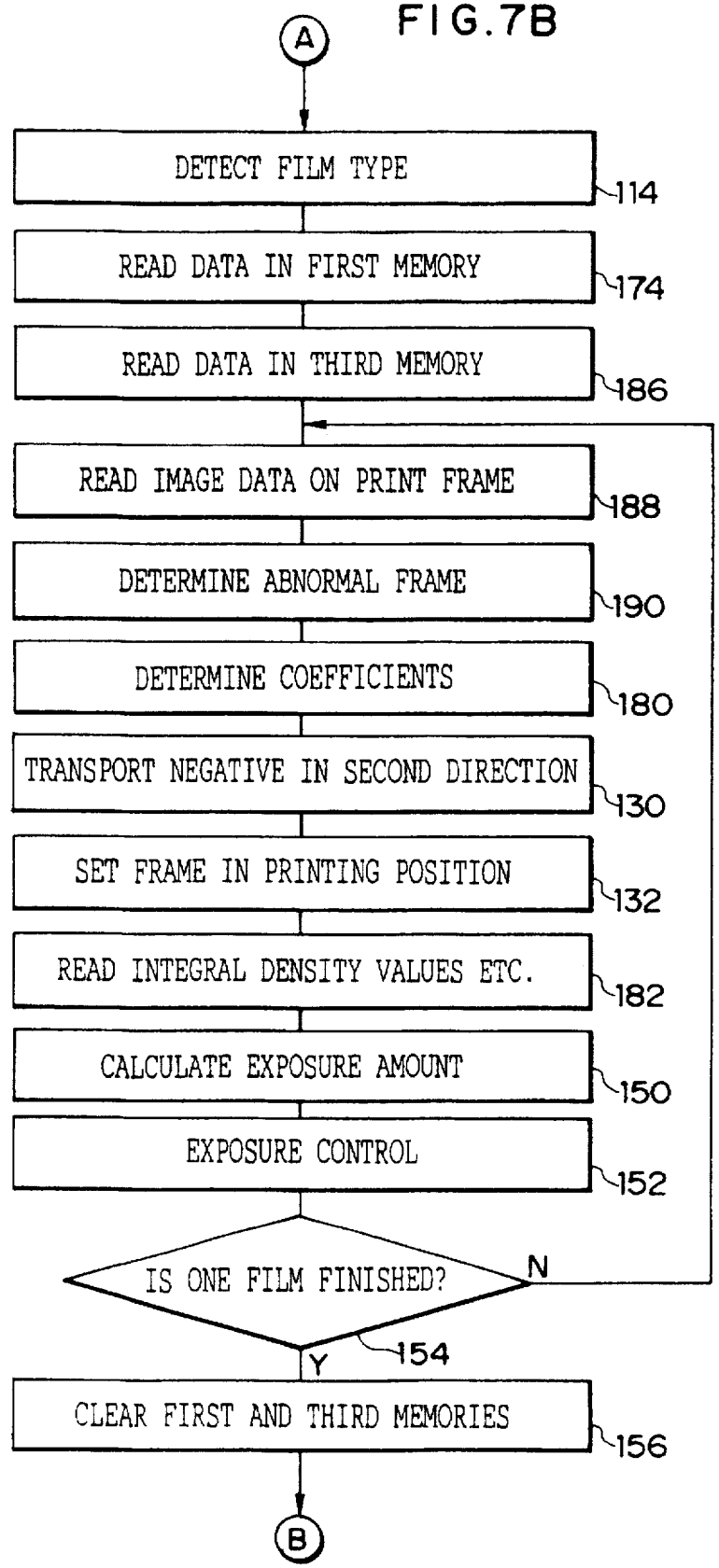

ST REFERENCE IMAGE

COLOR COPYING APPARATUS FOR DETERMINING EXPOSURE AMOUNT FROM IMAGE DATA OF AN ORIGINAL IMAGE AND A REFERENCE IMAGE

BACKGROUND OF THE INVENTION

1. Field of the Invention

The present invention relates to a color copying apparatus, and more particularly to a color copying apparatus including an analog printer and a digital printer for preparing a reproduced image by determining exposure amount of a color original image.

2. Description of the Related Art

It is known from the experiential rule that when an original image recorded on a color negative film is copied onto a copying material such as a photographic printing paper, it generally suffices to set the ratio of the three colors of light, blue (B), green (G), and red (R) transmitted through the original image to a substantially fixed ratio. For this reason, in a photographic printing apparatus, the exposure amount is determined on the basis of the following formula:

$$\text{Log } Ej = Kj + Dj \qquad (1)$$

where LogE is the logarithm of the exposure amount; K is a constant; D is the density (e.g., LATD) of the original image photometrically measured by a photometric system; and j is any one of the colors, R, G and B. In addition, if the original image is printed by a photographic printing apparatus by using the exposure amount determined on the basis of Formula (1) above, there are cases where, due to the characteristics of the photographic printing apparatus and the copying material, a print from an underexposed original image exhibits a higher overall density than a print from a properly exposed original image, while a print from an overexposed original image exhibits a lower density. For this reason, Dj in Formula (1) is corrected in correspondence with the density of the original image so as to determine the exposure amount.

However, with the exposure amount determined by using only the photometric data on the original image, the color and the density are not uniform among the prints, and prints with excellent finish cannot be obtained in some cases.

In the case of one film or a series of films in which a predetermined number of original images continue, the film characteristics are identical or similar, so that the characteristics of the original images in the frames to be printed (hereafter referred to as print frames) are also similar. A technique is known in which the exposure amount is determined by using average density values of original images and the densities of the respective original images concerning a series of film frames including print frames or one film frame including a print frame with respect to the image densities of the original images (refer to Japanese Patent Application Publication No. 112345/1976). Hence, it is possible to suppress variations in the color and density of one film or a series of films.

However, among the films, there are films whose film characteristics are in a standard state (hereafter referred to as normal films) as well as abnormal films whose film characteristics are in a different state (hereafter referred to as abnormal films). As examples of the abnormal films, it is possible to cite films whose characteristics have deteriorated over time, films including original images photographed by a photographing light source other than daylight, films developed in noticeably poor developing conditions among the developing conditions which vary among laboratories, and the like. With the above-described method, unless a discrimination is made between the abnormal films and the normal films in determining the exposure amount, the prints of either type of films cannot be finished with excellent quality.

In addition, Japanese Patent Application Publication No. 110829/1979 discloses a technique wherein, instead of using the average density values of original images of one film, a gray step image is burned in, and exposure is controlled on the basis of the density of the gray step image, which corresponds to the average density of print frames, and the densities of print frames. In this technique, prints can be made with high quality if the gray step image possesses average characteristics of a multiplicity of films with respect to one film or film type. However, the more the characteristics of the gray image deviate from the average characteristics, the more the print quality deteriorates. In addition, in a color copying apparatus, since the average characteristics cannot be distinguished, the prints which are obtained are not finished with excellent quality in some cases.

Further, there are cases where frames of special original images whose characteristics differ from those of other original images (hereafter referred to as the abnormal frames) are included in both the normal films and the abnormal films. If an attempt is made to obtain prints from original images on such abnormal frames, since the exposure amount is determined by characteristics similar to those of the other original images, prints with excellent finish cannot be obtained.

Generally, it is well known that if the exposure amount is determined by high color correction, an excellent print can be obtained from a frame which is considered to be an abnormal frame. However, in the event that an error has occurred in distinguishing the abnormal frame, color failure would occur and a print of an undesirable color would be formed. Accordingly, high accuracy in the distinction of the abnormal frames is required.

In order to detect the aforementioned abnormal frames, a technique has been proposed in which characteristic values (maximum densities of respective colors in the image plane, an area of a high-saturation color, etc.) for distinguishing abnormal original images are determined for one film including print frames, and an abnormal frame is detected by using an average value of these characteristic values (Japanese Patent Application Laid-Open No. 211136/1982). In the same way as the abnormal films, included among these abnormal frames are original images recorded on a film deteriorate over time, original images recorded on a film photographed by a photographing light source other than daylight, and original images recorded on a film which was developed under developing conditions which vary among laboratories. This technique requires much time and labor in the development of a determining method for detecting abnormal frames, so that this technique has not been efficient. In addition, this technique had a drawback in that an erroneous determination can be made in the case of a film in which a subject with a biased or predominant color such as the blue sky has been photographed.

In addition, Japanese Patent Application Laid-Open No. 319933/1992 discloses a technique of determining the exposure amount on the basis of average values of photomeric values of a plurality of frames of a film concerning timer-burnt-in prints. However, this technique is applicable to cases where standard subjects have been photographed in the plurality of frames, and it is difficult to accurately determine the exposure amount in the case of images containing subjects with a biased color which is liable to produce color failure or the like. Also, it is very difficult to properly determine an exposure amount with corrections made in differences in development and variations in the film characteristics.

As a technique for overcoming this problem, Japanese Patent Application Laid-Open No. 110829/1979 discloses a technique wherein a gray step image is burned into a film, and exposure is controlled on the basis of the density of the gray step image and the densities of print frames. In this technique, a gray step image is test-exposed on the color film before its development, and print frames are photometrically measured after development. At the same time, density characteristics concerning the three primaries of the gray step image are measured, an average density of density steps of the gray step image is determined, and exposure amount is then determined by using as a reference the density of the gray step which is closest to the average density of the gray color of the print frame. In addition, the exposure amount can be determined by multiplying the average density of the density step used as the reference and the average density of the print frame by weighting factors.

With this technique, if the relative spectral distributions of the illuminating light at the time of test exposure and the light from the subject (hereafter referred to as the photographing light) leading to the film after being transmitted through a camera lens accurately match, the density of the gray step image can be utilized in exposure control. However, if the relative spectral distributions differ, the print quality deteriorates. For example, in a case where the photographing light is sunlight, it is considerably difficult to allow the artificial light (illuminating light) at the time of test exposure to match the sunlight.

In addition, to burn in the gray step image serving as a reference, it is necessary to steadily obtain stable illuminating light regardless of changes over time and in the environment. The exposure apparatus for performing test exposure is required to be managed so that a fixed exposure amount can be obtained at different times in one day or over an extended period of time or even when a change has taken place in the ambient environment. Also, the exposure apparatus is required to be provided with a managing mechanism for such a purpose. In addition, as for such exposure apparatuses, it is necessary to eliminate machine differences among a plurality of exposure apparatuses. That is, the print quality may possibly decline substantially if, in a printer at the time of a reorder or make-over, the exposure amount is determined on the basis of the gray step image used in an exposure apparatus having a machine difference with the exposure apparatus used in the printing of the gray step image.

Furthermore, prints can be made with high quality if the gray step image possesses average characteristics of films. However, the more the characteristics of the gray image deviate from the average characteristics, the more the print quality deteriorates. For example, the tone of color becomes biased, i.e., a certain color undesirably tends to predominate, when the color temperatures of daylight do not match due to a difference of the season or the photographing district. In such a case, the print quality may possibly deteriorate, and it is therefore necessary to cause the color temperatures to match.

To overcome these problems, a measure can be provided by resetting the printing conditions on a trial-and-error basis each time the print is made, but the operation and processing become complex, so that this measure is not practical.

SUMMARY OF THE INVENTION

The present invention has been devised in view of the above-described circumstances, and its primary object is to provide a color copying apparatus which always makes it possible to obtain high-quality prints irrespective of a change in the characteristics of films, such as films deteriorated over time, films including original images photographed by a photographing light source other than daylight, and films developed under developing conditions which vary among laboratories.

A second object of the present invention is to provide a color copying apparatus which always makes it possible to obtain high-quality prints on the basis of the density of a reference image and the density of a print frame.

In accordance with a first aspect of the invention there is provided a color copying apparatus comprising: photometrically measuring means for dividing an original image recorded on one film or a series of films into a multiplicity of pixels and for effecting photometry by color-separating the original image into at least three primary colors; extracting means for extracting film characteristic data by photometrically measuring a reference image recorded on a predetermined portion of the film; storage means for storing the extracted film characteristic data; image-data generating means for generating image data representing a characteristic of the original image on the basis of a photometric value of the original image; determining means for determining an exposure calculating formula for determining an exposure amount by using the stored film characteristic data, or film characteristic data and the image data; exposure-amount calculating means for determining the exposure amount from the image data on the original image on the basis of the determined exposure calculating formula; and exposure controlling means for effecting exposure control on the basis of the exposure amount determined by the exposure-amount calculating means.

In accordance with a second aspect of the invention there is provided a color copying apparatus comprising: photometrically measuring means for dividing an original image recorded on one film or a series of films into a multiplicity of pixels and for effecting photometry by color-separating the original image into at least three primary colors; extracting means for extracting film characteristic data by photometrically measuring a reference image recorded on a predetermined portion of the film; first storage means for storing the extracted film characteristic data; image-data generating means for generating image data representing a characteristic of the original image on the basis of a photometric value of the original image; second storage means for storing the image data on a plurality of original images; determining means for determining an exposure calculating formula for determining an exposure amount by using the film characteristic data and the image data; exposure-amount calculating means for determining the exposure amount from the image data on the original image on the basis of the determined exposure calculating formula; and exposure controlling means for effecting exposure control on the basis of the exposure amount determined by the exposure-amount calculating means.

In accordance with a third aspect of the invention there is provided a color copying apparatus comprising: photometrically measuring means for dividing an original image recorded on one film or a series of films into a multiplicity of pixels and for effecting photometry by color-separating the original image into at least three primary colors; extracting means for extracting film characteristic data by photometrically measuring a reference image recorded on a predetermined portion of the film; first storage means for storing the extracted film characteristic data; second storage means for storing film characteristic data on a multiplicity of films of the same film type as the film; image-data generating means for generating image data representing a characteristic of the original image on the basis of a photometric value of the original image; third storage means for storing the image data on a multiplicity of frames included in the film; fourth storage means for storing image data on a multiplicity of frames of a multiplicity of films of the same film type as the film; determining means for determining an exposure calculating formula for determining an exposure amount by using at least two items of data including the film characteristic data stored in the first storage means and the second storage means and the image data stored in the third storage means and the fourth storage means; exposure-amount calculating means for determining the exposure amount from the image data on the original image on the basis of the determined exposure calculating formula; and exposure controlling means for effecting exposure control on the basis of the exposure amount determined by the exposure-amount calculating means.

In accordance with a fourth aspect of the present invention, in the color copying apparatus according to the third aspect of the invention, the determining means determines the exposure amount by using at least two items of data, including the film characteristic data stored in the first storage means and the second storage means and the image data stored in the third storage means and the fourth storage means, as well as the image data generated by the image-data generating means.

In accordance with a fifth aspect of the present invention, the color copying apparatus according to the third aspect of the invention further comprises: pixel selecting means for selecting a pixel of the original image, wherein the image-data generating means generates the image data representing the characteristic of the original image on the basis of the photomeric value of the pixel selected from the original image.

In accordance with a sixth aspect of the present invention, in the color copying apparatus according to the fifth aspect of the invention, the pixel selecting means selects the pixel on the basis of the film characteristic data.

In accordance with a seventh aspect of the present invention, in the color copying apparatus according to the fifth aspect of the invention, the pixel selecting means selects the pixel on the basis of the image data.

In accordance with an eighth aspect of the present invention, there is provided a color copying apparatus comprising: photometrically measuring means for dividing an original image recorded on a film into a multiplicity of pixels and for effecting photometry by color-separating the original image into at least three primary colors;
  extracting means for extracting film characteristic data by photometrically measuring a reference image recorded on a predetermined portion of the film; first storage means for storing the extracted film characteristic data; second storage means for storing film characteristic data on a multiplicity of films of the same film type as the film;
  image-data generating means for generating image data representing a characteristic of the original image on the basis of a photometric value of the original image; third storage means for storing the image data on a multiplicity of frames; correction-value calculating means for determining a correction value for correcting the film characteristic data stored in the first storage means on the basis of the film characteristic data stored in the second storage means and the image data stored in the third storage means, so as to determine corrected film characteristic data in which the film characteristic data stored in the first storage means is corrected the determined correction value;
  exposure-amount calculating means for determining an exposure amount on the basis of the corrected film characteristic data determined by the correction-value calculating means and the image data; and exposure controlling means for effecting exposure control on the basis of the exposure amount determined by the exposure-amount calculating means.

In accordance with a ninth aspect of the present invention, in the color copying apparatus according to the eighth aspect of the invention, the image-data generating means includes pixel selecting means for selecting a pixel of the original image.

In accordance with a 10th aspect of the present invention, in the color copying apparatus according to the eighth aspect of the invention, the correction-value calculating means calculates a difference or a ratio between the film characteristic data in the second storage means corresponding to a density and the image data in the third storage means, and a result of the calculation is used as the correction value.

In accordance with a 11th aspect of the present invention, in the color copying apparatus according to the eighth aspect of the invention, the exposure-amount calculating means uses the film characteristic data corresponding to a density of the original image determined on the basis of the corrected film characteristic data.

In accordance with a 12th aspect of the present invention, the color copying apparatus according to the eighth aspect of the invention further comprises: film-type identifying means for identifying a type of the film, wherein the second storage means stores the film characteristic data in correspondence with the type of the film identified by the film-type identifying means.

In accordance with a 13th aspect of the present invention, there is provided a color copying apparatus comprising: photometrically measuring means for dividing an original image recorded on a film into a multiplicity of pixels and for effecting photometry by color-separating the original image into at least three primary colors; extracting means for extracting film characteristic data by photometrically measuring a reference image recorded on a predetermined portion of the film; first storage means for storing the extracted film characteristic data; second storage means for storing film characteristic data on a multiplicity of films of the same film type as the film; image-data generating means for generating image data representing a characteristic of the original image on the basis of a photometric value of the original image; third storage means for storing the image data on a multiplicity of frames included in the film; correction-value calculating means for determining a correction value for correcting the film characteristic data stored in the first storage means on the basis of the film characteristic data stored in the second storage means and the image data stored in the third storage means, so as to determine corrected film characteristic data in which the film characteristic data stored in the first storage means is corrected the determined correction value; input means for inputting instruction information for identifying an exposure-amount determining method for determining an exposure amount at the time of producing a print from the original image; exposure-amount calculating means for determining an exposure amount in compliance with the exposure-amount determining method according to the instruction information, and on the basis of the corrected film characteristic data determined by the correction-value calculating means and the image data; and exposure controlling means for effecting exposure control on the basis of the exposure amount determined by the exposure-amount calculating means.

In accordance with a 14th aspect of the present invention, in the color copying apparatus according to the 13th aspect of the invention, the exposure-amount calculating means sets predetermined weighting coefficients on at least the corrected film characteristic data and the image data, respectively, alters the weighting coefficient of the corrected film characteristic data in accordance with the exposure-amount determining method instructed by the instruction information, and determines the exposure amount on the basis of a value obtained by adding the respective data multiplied by the set weighting coefficients.

In accordance with the first aspect of the present invention, a predetermined reference image is recorded in advance on a predetermined portion of one film or a series of films. This reference image is photometrically measured, film characteristic data is extracted by the extracting means, and the extracted film characteristic data is stored in the storage means. As the film characteristic data, it is possible to adopt the following: the tricolor average density of the film; a color balance such as each color density or color difference with respect to that density; a density with respect to a predetermined exposure amount; a base density of the film; each color density or an average density with respect to a monochromatic light source; each color density or an average density with respect to a white light source; and each color density difference or an average density difference color, or a density histogram or a cumulative curve with respect to a monochromatic light source or a white light source. In addition, as for the reference image, it suffices if it is formed by a density pattern of a fixed distribution or a pattern allowing a different density to be obtained for each divided region and allowing a predetermined density gradient to be obtained, such that a color balance such as each color density or a color difference with respect to the tricolor average density of these films, as well as the density with respect to a predetermined exposure amount, can be extracted. The image-data generating means generates the image data representing the characteristic of the original image on the basis of the photometric values obtained by photometrically measuring the original image. Incidentally, the characteristic amount of the image includes image data, and the image data is data corresponding to the film characteristic data extracted from the original image or data which permits the compilation of that data. The image data can be adopted in correspondence with film characteristic data, including photomeric data, selected data in which data necessary for the determination of the exposure amount is selected from the photomeric data (e.g., data excluding high-saturation data), results in which, after the photomeric data or selected data is classified according to density, and average values, added values, and the number of the data thus classified are calculated, a density histogram or a color density difference histogram, and a density cumulative curve or a color difference cumulative curve. The determining means determines an exposure calculating formula for determining an exposure amount by using the film characteristic data stored in the storage means, or film characteristic data or the image data. The exposure amount is determined by the exposure-amount calculating means in accordance with the determined calculating formula, and exposure control is effected by the exposure controlling means on the basis of the determined exposure amount.

Since the tricolor balance of an original image generally differs among different types of film, it is necessary to use the tricolor balance in correspondence with the film type. In accordance with the first aspect of the invention, a reference image is recorded in a predetermined portion of the film. For example, if an image in which the reference image has been exposed with a predetermined exposure amount for each color is used, the hue in which the densities of the three colors are integrated becomes gray or a hue close to gray corresponding to that film type. Accordingly, gray or the hue close to gray represents a color balance peculiar to the film, and reflects the characteristics of the film (tricolor sensitivity balance, tricolor gradation balance, tricolor density balance, etc.) including a change due to deterioration over time. If the exposure calculating formula is determined on the basis of this film characteristic data, exposure can be effected with an optimum exposure amount irrespective of the change in film characteristics due to the use of a different type of film or deterioration over time.

As the image data as well, it is preferable to adopt data related to the density. The image data based on photometry with respect to an original image on a film on which the original image to be printed has been recorded reflects the tendency of the color balance of the original image. Accordingly, if a comparison is made between the film characteristic data and the image data, a determination can be made as to whether or not the original image to be printed deviates from the tendency of the color balance peculiar to the film. If the exposure calculating formula is determined on the basis of the result of this determination, even in the case of a film which has undergone deteriorated over time, the exposure amount can be determined by taking into consideration the tendency of the color balance of the original film itself and by taking into consideration gray or a fixed hue close to gray and peculiar to the film, thereby making it possible to constantly obtain high-quality prints.

In the second aspect of the present invention, the extracted film characteristic data is stored in the first storage means, and image data on a plurality of original films is stored in the second storage means. Accordingly, from the image data stored in the second storage means, a standard gray or a fixed hue close to the standard gray can be obtained as the hue in which the densities of the three colors are integrated. For this reason, if a comparison is made between the film characteristic data and the image data stored in the second storage means, it is possible to determine whether or not the film including the original image to be printed is close to a film having a standard color balance. If the exposure calculating formula is determined from the result of this determination such that the hue becomes close to the hue of gray, it is possible to determine an exposure amount in which the effect on color failure is eliminated from a film in which color failure is likely to occur.

In accordance with the third aspect of the present invention, the extracted film characteristic data is stored in the first storage means; film characteristic data on a multiplicity of films of the same film type as the relevant film is stored in the second storage means; the image data on a multiplicity of frames included in the film is stored in the third storage means; and image data on a multiplicity of frames of a multiplicity of films of the same film type as the relevant film is stored in the fourth storage means. The film characteristic data is such that the hue in which the densities of the three colors of a plurality of reference images are integrated becomes a standard gray, or a hue close to gray, concerning the same film type as the relevant film. The film characteristic data in the first storage means corresponds to a gray, or a hue close to the gray, which is peculiar to the relevant film. The image in the fourth storage means corresponds to characteristics of general films based on gray, or a fixed hue closed to gray, concerning the original image and corresponding to the film type. The image data in the third storage means reflects the characteristics of the film itself including all the original images to be printed. Accordingly, if at least two items of data including the film characteristic data stored in the first storage means and the second storage means and the image data stored in the third storage means and the fourth storage means, it is possible to take into consideration the tendency of the color balance of the film itself including the original image to be printed or the color balance peculiar to the same film type and to take into consideration the tendency of the color balance concerning the image on the film including the original image to be printed or a standard color balance of the same film type. Hence, it is possible to constantly obtain high-quality prints irrespective of a change in film characteristics such as deterioration over time.

In addition, as described in the fourth aspect of the present invention, if the exposure amount is determined by the determining means by using at least two items of data, including the film characteristic data stored in the first storage means and the second storage means and the image data stored in the third storage means and the fourth storage means, as well as the image data generated by the image-data generating means, it is possible to take into consideration the image data on the original image to be printed, thereby making it possible to obtain high-quality prints in which the color balance and the like of the original image to be printed are taken into consideration.

As described in the fifth aspect of the present invention, the color copying apparatus may further comprise the pixel selecting means for selecting a pixel of the original image. If the pixel selecting means selects the pixel on the basis of the film characteristic data as stated in the sixth aspect of the present invention, image data on which the film characteristic data is reflected is generated. Further, if the pixel selecting means selects the pixel on the basis of the image data as stated in the seventh aspect of the present invention, it is possible to select the pixel based on the standard gray.

In accordance with the eighth aspect of the present invention, a predetermined reference image is recorded in advance on a predetermined portion of a film. This reference image is photometrically measured, film characteristic data is extracted by the extracting means, and the extracted film characteristic data is stored in the storage means. As the film characteristic data, it is possible to adopt the following: the tricolor average density of the film; a color balance such as each color density or color difference with respect to that density; a density with respect to a predetermined exposure amount; a base density of the film; each color density or an average density with respect to a monochromatic light source; each color density or an average density with respect to a white light source; and each color density difference or an average density difference color, or a density histogram or a cumulative curve with respect to a monochromatic light source or a white light source. In addition, as for the reference image, it suffices if it is formed by a density pattern of a fixed distribution or a pattern allowing a different density to be obtained for each divided region and allowing a predetermined density gradient to be obtained, such that a color balance such as each color density or a color difference with respect to the tricolor average density of these films, as well as the density with respect to a predetermined exposure amount, can be extracted. The film characteristic data on a multiplicity of films of the same film type as this film is stored in the second storage means.

The image-data generating means generates the image data representing the characteristic of the original image on the basis of the photometric values obtained by photometrically measuring the original image. Incidentally, the characteristic amount of the image includes image data, and the image data is data corresponding to the film characteristic data extracted from the original image or data which permits the compilation of that data. The image data can be adopted in correspondence with film characteristic data, including photomeric data, selected data in which data necessary for the determination of the exposure amount is selected from the photomeric data (e.g., data excluding high-saturation data), results in which, after the photomeric data or selected data is classified according to density, and average values, added values, and the number of the data thus classified are calculated, a density histogram or a color density difference histogram, and a density cumulative curve or a color difference cumulative curve. In such selection or classification, if the image-data generating means includes pixel selecting means for selecting a pixel of the original image as stated in the ninth aspect of the present invention, it is readily select a pixel to be selected. The third storage means stores image data on a multiplicity of frames.

Since the film characteristic data stored in the second storage means is data on a multiplicity of films of the same film type, this film characteristic data corresponds to data on gray, i.e., an average value of data including such as variations or deviations of the exposing means for generating the reference image. Since the image data stored in the third storage means is image data on a multiplicity of frames, this image data represents an average value of the original image including changes in the color temperature due to various photographing light sources, a change in the spectral distribution of photographing light transmitted through the camera lens, and a change in the color balance due to the fading of the latent image occurring from the time of photographing until development.

Consequently, if a correction value for correcting the film characteristic data is determined on the basis of the film characteristic data stored in the second storage means and the image data stored in the third storage means, it is possible to determine the correction value for correcting the film characteristic data conforming to the original image on the film. As stated in the 10th aspect of the present invention, as for this correction value, a difference or a ratio between the film characteristic data in the second storage means corresponding to a density and the image data in the third storage means may be calculated, and a result of the calculation may be used as the correction value. Accordingly, the corrected film characteristic data in which the film characteristic data in the first storage means is corrected by the determined correction value becomes a value in which the film characteristic data is adjusted to the original image on the film.

If the exposure amount is determined by the exposure calculating means on the basis of the corrected film characteristic data and the image data, the film characteristic data can be corrected to a value better adjusted to the film image, thereby making it possible to determine the exposure amount accurately. Since data on density or data corresponding to the density is mainly used as the data for determining the exposure amount, as stated in the 11th aspect of the present invention, it is preferred that the exposure-amount calculating means use the film characteristic data corresponding to a density of the original image determined on the basis of the corrected film characteristic data. As exposure control is effected by the exposure controlling means on the basis of the determined exposure amount, it is possible to eliminate the effect on color failure, so that high-quality prints can always be obtained irrespective of a change in the film characteristics due to such as deterioration over time.

As stated in the 12th aspect of the present invention, the color copying apparatus may further comprise the film-type identifying means for identifying the type of film. As the second storage means stores the film characteristic data in correspondence with the type of the film identified by the film-type identifying means, film characteristic data corresponding to the film type is stored, so that it is possible to readily utilize the film characteristic data on the same film type as the film from which a print is to produced.

In the color copying apparatus in accordance with the 13th aspect of the present invention, the input means inputs instruction information for identifying an exposure-amount determining method for determining an exposure amount at the time of producing a print from the original image. The exposure-amount determining method can be determined in accordance with the instruction information, and the exposure with an exposure amount based on the corrected film characteristic data can be selectively carried out. Hence, it is possible to determine an optimum exposure amount with respect to a film from which a timer-burnt-in print is to be made, a film intentionally photographed by the photographer, and the like. As stated in the 14th aspect of the present invention, the exposure-amount calculating means may set predetermined weighting coefficients on at least the corrected film characteristic data and the image data, respectively, may alter the weighting coefficient of the corrected film characteristic data in accordance with the exposure-amount determining method instructed by the instruction information, and may determine the exposure amount on the basis of a value obtained by adding the respective data multiplied by the set weighting coefficients. In this case, in a case where the weighting coefficients are set on the data from the first storage means and the data from the second storage means such that the weight on the data from the second storage means, for instance, becomes greater, a value in which the weighting coefficients are imparted to the respective data and are added corresponds to the result in which a correction is made in such a manner as to become close to the original image obtained by photometrically measuring an image frame of a gray hue. Accordingly, on the basis of the value in which the weighting coefficients are imparted to the respective data and added, it is possible to obtain exposure conditions in which the effect on color failure is eliminated from the photometric data on the original image which is liable to cause color failure.

In addition, in a case where the weighting coefficients are set such that the weight on the data from the third storage means becomes greater, a value in which the weighting coefficients are imparted to the respective data and are added corresponds to the result in which a correction is made in such a manner as to reflect the tendency of the color balance of the overall image recorded on the film and changes in the film characteristics. Accordingly, in a case where the film characteristics have changed due to the deterioration over time or the like, it is possible to obtain exposure conditions which are corrected in correspondence with the degree of the change of the characteristics. Further, if only the image frame to be printed was photographed with a different type of light source, if the weighting coefficients are set in such a manner that the weight on the data in the third storage means becomes larger, it is possible to obtain appropriate exposure conditions without being affected by the difference in color balance with the other original images due to the use of a different light source or the like.

Thus, if the weighting coefficients to be imparted to the respective data are set appropriately, it is possible to eliminate the effect on color failure, and always obtain high-quality prints irrespective of a change in the film characteristics due to such as deterioration over time.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein:

FIGS. 2A and 2B are flowcharts illustrating an exposure control routine in accordance with a first embodiment;

FIGS. 7A and 7B are flowcharts illustrating an exposure control routine in accordance with a fifth embodiment;

DESCRIPTION OF THE PREFERRED EMBODIMENTS

Figure 1:
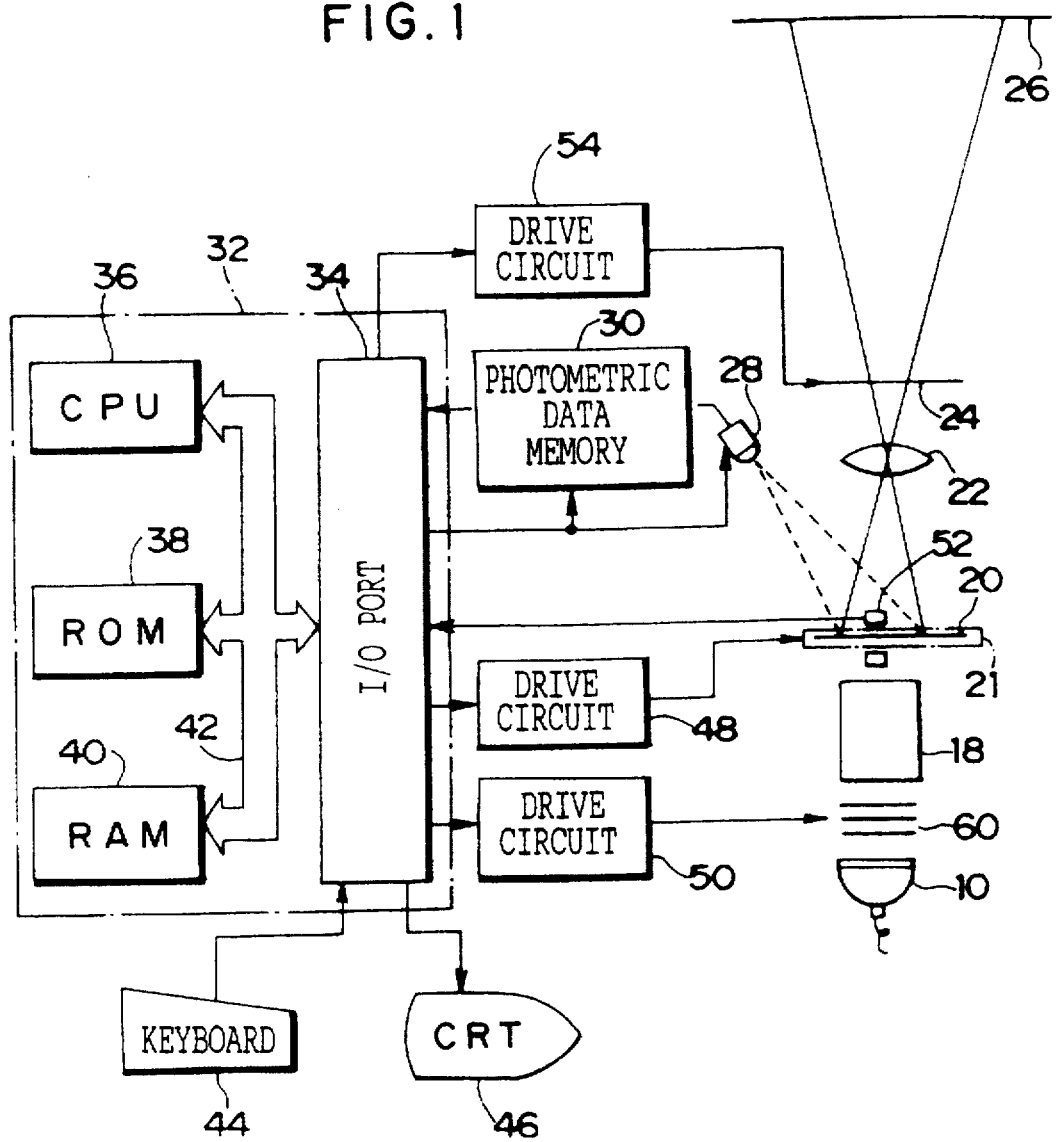
FIG. 1 is a schematic diagram illustrating a photographic printing apparatus which can be used in embodiments of the present invention.

Referring now to the accompanying drawings, a detailed description will be given of a first embodiment of the present invention. FIG. 1 illustrates a photographic printing apparatus to which the present invention is applicable.

A mirror box 18 and a lamp house 10 having a halogen lamp are disposed below a negative carrier 21 for transporting a color negative film 20 in the longitudinal direction of the negative film while nipping the negative film 20 by pairs of rollers. A color-adjusting filter 60 is disposed between the mirror box 18 and the lamp house 10. The light-adjusting filter 60 is comprised of a yellow (Y) filter, a magenta (M) filter, and a cyan (C) filter which can be moved into and away from an optical path in a known manner.

A lens 22, a black shutter 24, and a color paper 26 are arranged in that order above the negative carrier 21. The arrangement provided is such that rays of light emitted from the lamp house 10 are transmitted through the light-adjusting filter 60, the mirror box 18, the negative film 20 loaded in the negative carrier 21, and the lens 22, thereby allowing an original image on the negative film 20 to form an image on the color paper 26 by means of the lens 22.

A DX code representing the kind of negative film is recorded at a side edge of the negative film 20 in the form of a bar code, and notches are formed at the side edge of the negative film 20 in correspondence with respective frames (print frames) each having a printable original image among the respective frames (film frames) with original images recorded thereon. A detector 52 which is constituted by a light-emitting element and a light-receiving element is disposed with the side edge of the negative film 20 placed therebetween so as to detect the DX code and the notches.

In addition, a reference image for obtaining film characteristic data (which will be described later) is recorded on the negative film 20. This reference image is recorded on a predetermined unexposed portion of the negative film 20 before the negative film 20 is developed. In this embodiment, a portion which has the same size as the film frame and on which no image is recorded during photographing, e.g., a film frame region following a final film frame, is designated as the unexposed portion. A side edge portion or an area between adjacent film frames may be used as the unexposed portion.

Figure 8A:
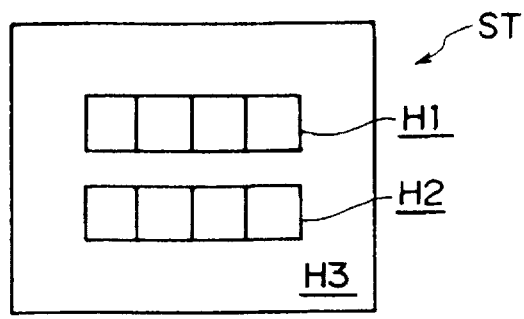
FIGS. 8A, 8B, 8C, and 8D are image diagrams illustrating a reference image recorded on a negative film.
Figure 8B:
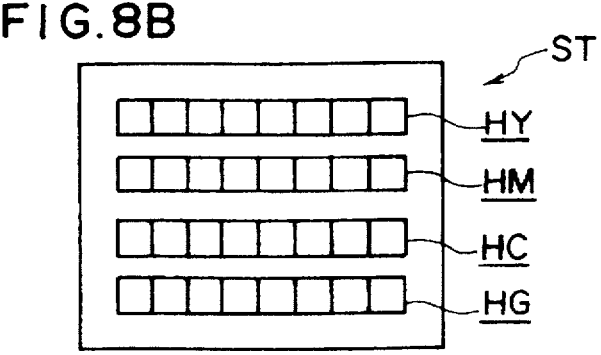
Figure 8C:
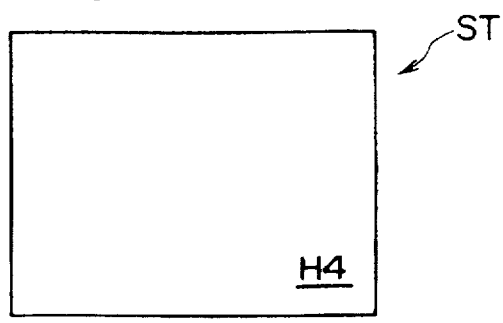
Figure 8D:
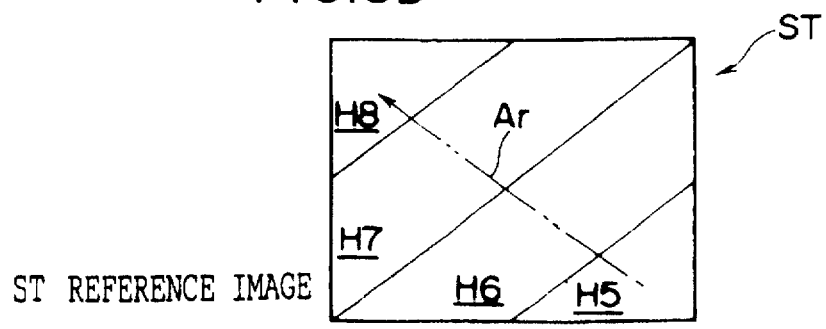

As shown in FIG. 8A, a reference image ST is provided with density steps constituted by a low-density region H1 and a high-density region H2 each having a plurality of steps corresponding to predetermined exposure amounts. A region surrounding the low- and high-density regions H1 and H2 is set as a region H3 of an intermediate density or a density different from the low and high densities. As shown in FIG. 8B, this reference image ST may be recorded with step-like densities for respective colors in such a manner as to form a region HY for the Y color, a region HM for the M color, a region HC for the C color, and a gray region HG as a gray step image. Alternatively, as shown in FIG. 8C, a region H4 having a uniform density corresponding to a predetermined exposure amount may be recorded as the reference image ST. Still alternatively, as shown in FIG. 8D, the reference image ST may be divided into a plurality of regions H5, H6, H7, and H8, and the densities of the regions H5 to H8 may be recorded such that the density increases from a low density to a high density along a predetermined direction (in the direction of arrow Ar in FIG. 8D). From these reference images, it is possible to extract various film characteristic data, including (1) the color balance (e.g., color differences R–G, B–G, color densities of R, G and B, or color differences R–tricolor average density, G–tricolor average density, and B–tricolor average density) with respect to the film density (e.g., tricolor average density); (2) a film density with respect to exposure amount (H & D curve); (3) a film base (mask) density; and (4) a monochromatic exposure color-development density and a white-color exposure color-development density and a difference therebetween. Incidentally, the reference image is not limited to the above arrangements, and it suffices insofar as at least one of the film characteristic data (1), (2), and (4) mentioned above can be extracted from the reference image. For example, a white-and-black natural image may be exposed as an original image.

A scanner 28, which is constituted by a two-dimensional image sensor having a CCD for effecting photometry for each color of R (red), G (green), and B (blue) by dividing the original image on the negative film into a plurality of segments, is disposed at a position which is set off from the optical axis of the image-forming optical system shown in FIG. 1 and at which the density of the original image on the negative film 20 can be photometrically measured. The scanner 28 is capable of effecting photometry by separating the light into three wavelength bands of R, G, and B in a state in which the original image in a frame (print frame) to be printed and positioned on the negative carrier 21 is divided into a plurality of segments. Incidentally, the scanner 28 may be so arranged as to effect photometry on the basis of a multiplicity of spectra, and to determine photometric values of R, G, and B through calculation.

The scanner 28 is electrically connected to an exposure-amount determining device 32, which is constituted by a personal computer, via a photometric data memory 30 for subjecting photometric values photometrically measured by the scanner 28 to logarithmic transformation and for storing the data for each frame. Incidentally, the photometric data may be stored in the photometric data memory 30 after being subjected to logarithmic transformation by the personal computer. Although a detailed description will be given later, the photometric data memory 30 is comprised of a first memory for recording first film characteristic data concerning one film or a series of films including print frames; a second memory for storing second film characteristic data concerning a multiplicity of films for each type of film; a third memory for storing first average image data concerning one film or a series of films including print frames; and a fourth memory for storing second average image data concerning a multiplicity of films for each type of film. As for these first to fourth memories, it suffices if areas are set in advance in the photometric data memory 30 so as to be used in divided form in correspondence with uses, and are made to correspond to the same. As the setting is thus made, one memory can be provided with a plurality of storage functions. In addition, the first memory to the fourth memory may be added as separate arrangements.

The exposure-amount determining device 32 is comprised of an input/output port 34, a central processing unit (CPU) 36, a read only memory (ROM) 38, a random access memory (RAM) 40, buses including a data bus and a control bus connecting them, and the like. A exposure-amount control routine which is described below is stored in the ROM 38.

The input/output port 34 of the exposure-amount determining device 32 is electrically connected to the photometric data memory 30 so as to control the write and read timings, and is also electrically connected to the scanner so as to control the photometrically measuring timing.

Further, the input/output port 34 is electrically connected to a motor for driving the pair of rollers of the negative carrier 21 through a drive circuit 48, and is also electrically connected to a driving unit of the light-adjusting filter 60 through a drive circuit 50 and to a driving unit of the black shutter 24 through a drive circuit 54, respectively. A keyboard 44, a detector 52, and a CRT 46 are also connected to the input/output port 34.

Figure 3:
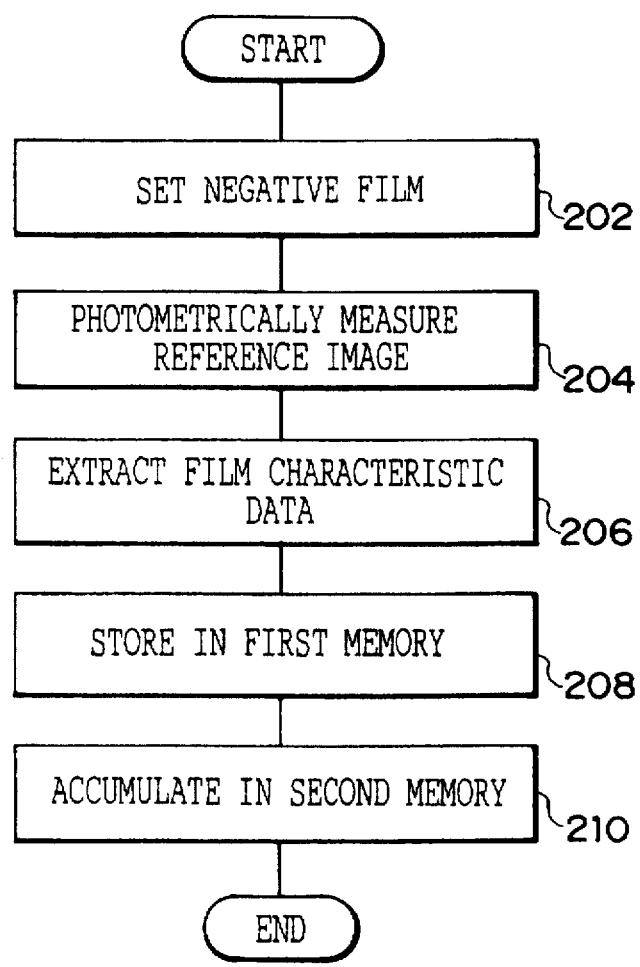
FIG. 3 is a flowchart illustrating a film-characteristic extracting routine in the present invention.

Next, referring to FIGS. 2A, 2B, and 3, a description will be given of the exposure control routine in accordance with the first embodiment. When the negative film 20 is loaded in the negative carrier 21, and a start switch is turned on, in Step 100 in FIG. 2A, the film characteristic data on the negative film 20 loaded in the negative carrier 21 is extracted. In Step 100, a film-characteristic extracting routine shown in FIG. 3 is executed. In Step 202 in FIG. 3, the negative carrier 21 is driven to transport the negative film, a predetermined number of frames (e.g., the number of photographed frames +1 or 0) is counted by detecting the notches by means of the detector, and a frame for the reference image is set in a printing position. In an ensuing Step 204, the reference image in the frame set in the printing position is divided into a multiplicity of pixels by the scanner 28, and photometry is conducted with respect to the pixels for each color of R, G, and B, and the photometric values concerning all the pixels are subjected to logarithmic transformation. By using these logarithmically transformed values of the photometric values, film characteristic data is extracted in an ensuing Step 206.

Figure 9A:
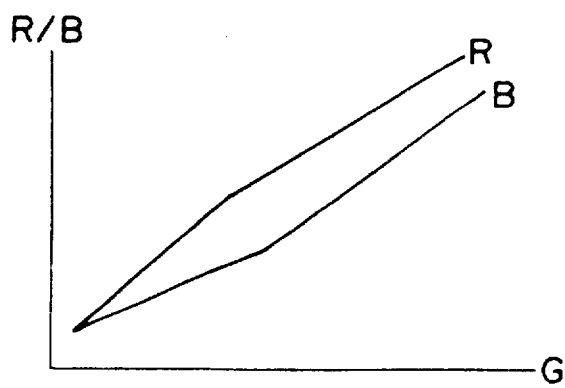
FIGS. 9A and 9B are diagrams illustrating characteristic curves for extracting film characteristic data from the reference image.
Figure 9B:
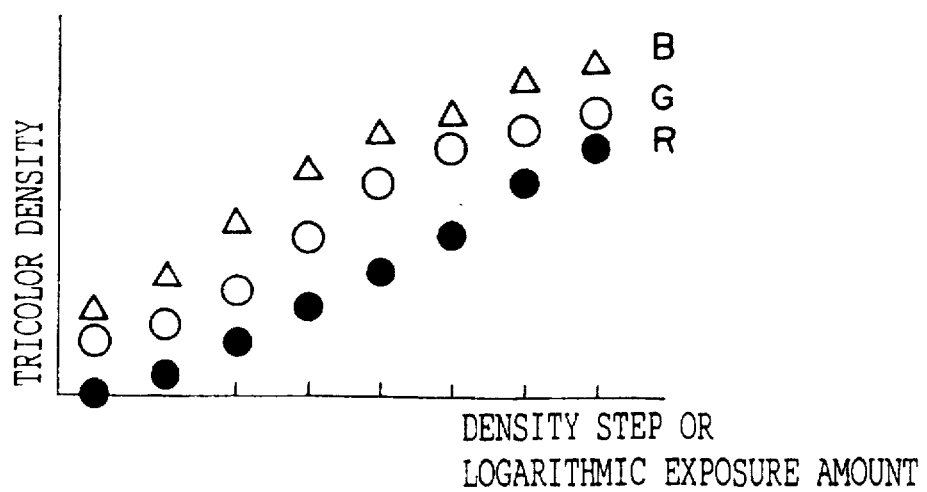
Figure 10A:
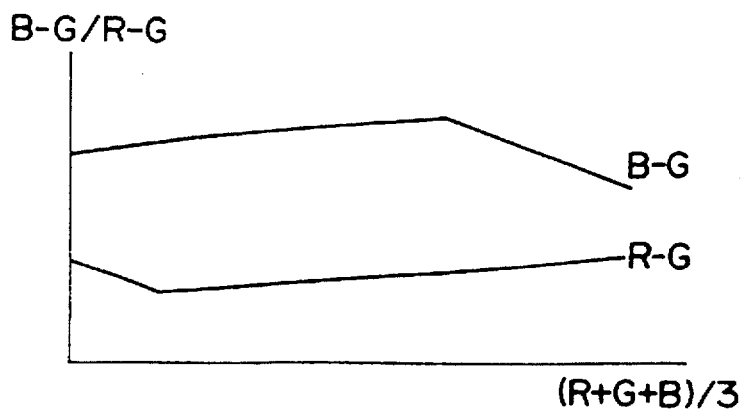
FIGS. 10A and 10B are diagrams illustrating other characteristic curves for extracting film characteristic data from the reference image.
Figure 10B:
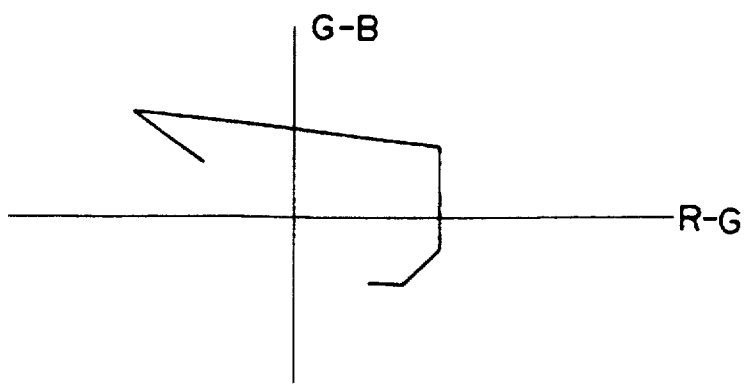

A description will be given by citing as an example the reference image shown in FIG. 8A. The regions H1 and H2 which are image portions of the reference image are set, and the density of one density step (a region having a fixed density in each region H1, H2) is determined. This density can be determined by determining the density of a central portion of one density step or from an average density of a plurality of pixels in the vicinity of the center. The film characteristic data is extracted from a plurality of densities thus determined. As shown in FIG. 9A, the film characteristic data can be extracted by determining the densities of R and B with respect to the density of G in each density step, and by connecting (interpolating) the respective densities for each color. In addition, as shown in FIG. 9B, the film characteristic data may be extracted by determining the relationship between the density (or the logarithm of the exposure amount) of each density step and the densities of the three colors. Further, in a case where the tricolor average density of the negative film is detected, as shown in FIG. 10A, the color balance may be set as the film characteristic data by determining the values of corresponding color differences B–G and R–G in each step. Furthermore, as shown in FIG. 10B, the film characteristic data may be determined from color differences B–G and G–B.

The extracted film characteristic data is stored in the first memory of the photometric data memory 30 in an ensuing Step 208, and is accumulated in the second memory in an ensuing Step 210.

When the film characteristic data is stored in the photometric data memory 30, if a plurality of reference images are present in one film or a series of films, any one item of the film characteristic data may be stored in the first memory, or its average value may be stored therein. In addition, the individual film characteristic data may be stored separately in the second memory without being accumulated.

Upon completion of the extraction of the film characteristic data, in Step 102 in FIG. 2A, the negative carrier 21 is driven to transport the negative film in a first direction along the longitudinal direction of the negative film. When a notch is detected by the detector, an initial frame is set in the printing position in Step 104. When the negative film is transported in the first direction, the transport may be started beginning with a leading end of the negative film or a trailing end of the negative film. Further, the frame may be set in the printing position by detecting an edge of the frame.

In Step 106, the original image in the frame set in the printing position is divided into a multiplicity of pixels by the scanner 28, and the respective pixels are photometrically measured for each color of R, G, and B. In Step 108, all the sets of photometric values (photometric values for all the pixels) are subjected to logarithmic transformation, and the logarithmically transformed values of the photometric values are stored in the photomeric data memory 30 for each frame as the sets of photometric data. When the photometric data is stored in the photomeric data memory 30, the photomeric data R, G, and B of the frames are stored in accordance with a predetermined arrangement. In this case, the photomeric data on R, G, and B may be stored as it is, or may be stored by performing data compression to reduce the memory capacity. Thus, sets of photomeric data R, G, and B are stored in the photomeric data memory 30 for each frame.

In an ensuing Step 110, the number of photometrically measured frames is counted. In Step 112, a determination is made from the count value as to whether or not the photometry of one negative film has been completed. If the photometry of one negative film has not been completed, the operation returns to Step 102 to transport the negative film by one frame portion in the first direction, and photometry and the storage of sets of photomeric data are repeated. Thus, the sets of photomeric data on the respective three colors R, G, and B for one negative film are set for each frame, i.e., the sets of photometric data on the original images of all the frames at least subject to copying are stored in the memory.

In Step 114, a plurality of frames are selected for calculating the first average image data on a plurality of original images including the original images of frames to be printed. In Step 116, the sets of photomeric data on the selected frames are read from the memory, and in Step 118 the first average image data is calculated. This first average image data is stored in the third memory. Incidentally, the sets of the photomeric data on the selected frames may be stored in the third memory.

This first average image data is data corresponding to at least the film characteristic data. For example, it is possible to adopt the respective average color densities or average color-density differences (e.g., R–G, G–B) determined from the sets of photomeric data on the plurality of original images including the original images of frames to be printed with respect to the density of one color (e.g., G density) or a tricolor average density ((R+G+B)/3). Further, a functional formula or a table value prepared from the sets of photomeric data may be used.

The first average image data on the plurality of original images including the original images of frames (print frames) to be printed can be calculated by selecting all the frames of one film, and by performing calculation on the basis of the sets of photomeric data on the plurality of original images of the film.

However, the first average image data may not necessarily be calculated from the sets of photomeric data on all the frames of one film. After the negative film is transported in the first direction and the photometry and the storage of the sets of photomeric data are completed, the number of all the frames of one film can be determined. Therefore, an arrangement may be provided such that frames in a number corresponding to the number of all the frames of one film are selected, and if the number of frames is 36, either frame of every two frames is selected to calculate the first average image data.

In addition, the selection of frames may be carried out, i.e., the sets of photomeric data may be selected, such that if it is determined that a certain frame deviates substantially from the first average image data on one film, the sets of photomeric data on the deviating frame are not used in the calculation of the first average image data. Further, even in a case where a certain frame is to be excluded from the object to be copied as a result of analysis of the photomeric data on the frame, the sets of photomeric data on the frame may be used in the calculation of the first average image data in compliance with the result of selection of frames.

Incidentally, the first average image data calculated in Step 118 may be determined on the basis of the sets of photomeric data on the original images of a multiplicity of frames of a multiplicity of films for each type of film stored in the fourth memory, or on the basis of image data determined from the sets of such photometric data. In this case, it is possible to adopt as the image data the color characteristics with respect to the sets of photometric data or values determined from density values, e.g., the density of one color (e.g., G density) or a tricolor average density ((R+G+B)/3). As the color characteristics, it is possible to adopt the respective average color densities or average color density differences (e.g., R–G, G–B) determined from the sets of photomeric data on a plurality of original images. Further, a functional formula or a table value prepared from the sets of photomeric data may be used as the image data.

In an ensuing Step 120, normalizing conditions for normalizing the sets of photomeric data are determined as will be described later.

In an ensuing Step 122, the type of negative film is detected on the basis of the DX code detected by the detector 52. In an ensuing Step 124, the sets of photomeric data on all the frames at least subject to copying and stored in the third memory are stored in the fourth memory in correspondence with the type of film detected in Step 122. Accordingly, a multiplicity of pieces of data on a plurality of or a series of films for each film type are stored in the fourth memory. In an ensuing Step 126, the film characteristic data stored in the first memory is read, and in an ensuing Step 128, a transformation table is generated by using the image data corresponding to the film type and the film characteristic data which has been read.

As the film characteristic data stored in the second memory and the image data stored in the fourth memory, a multiplicity of corresponding pieces of data, extracted from the reference image and the original images, are respectively stored, and can be respectively used as average data. For this reason, if these pieces of data are used, it is possible to generate an average transformation formula shown in Formula (2) below or a table of transformation between the film characteristic data and the image data for each film type.

FTCD=f(FTPD)  (2)

where,

FTCD: film characteristic data corresponding to the film type

FTPD: image data corresponding to the film type

Next, in Step 130, the negative film is transported in a second direction opposite to the aforementioned first direction without removing the negative film from the negative carrier, and after detecting a notch the first frame is set in the printing position in Step 132. Incidentally, if a final frame has been positioned in the printing position of the negative carrier, it is unnecessary to transport the negative film in the second direction.

In an ensuing Step 134, the sets of photomeric data on the frame which has been set are read from the memory, and in Step 136 the sets of photomeric data are normalized as follows in accordance with the normalizing conditions determined in Step 120.

Figure 11:
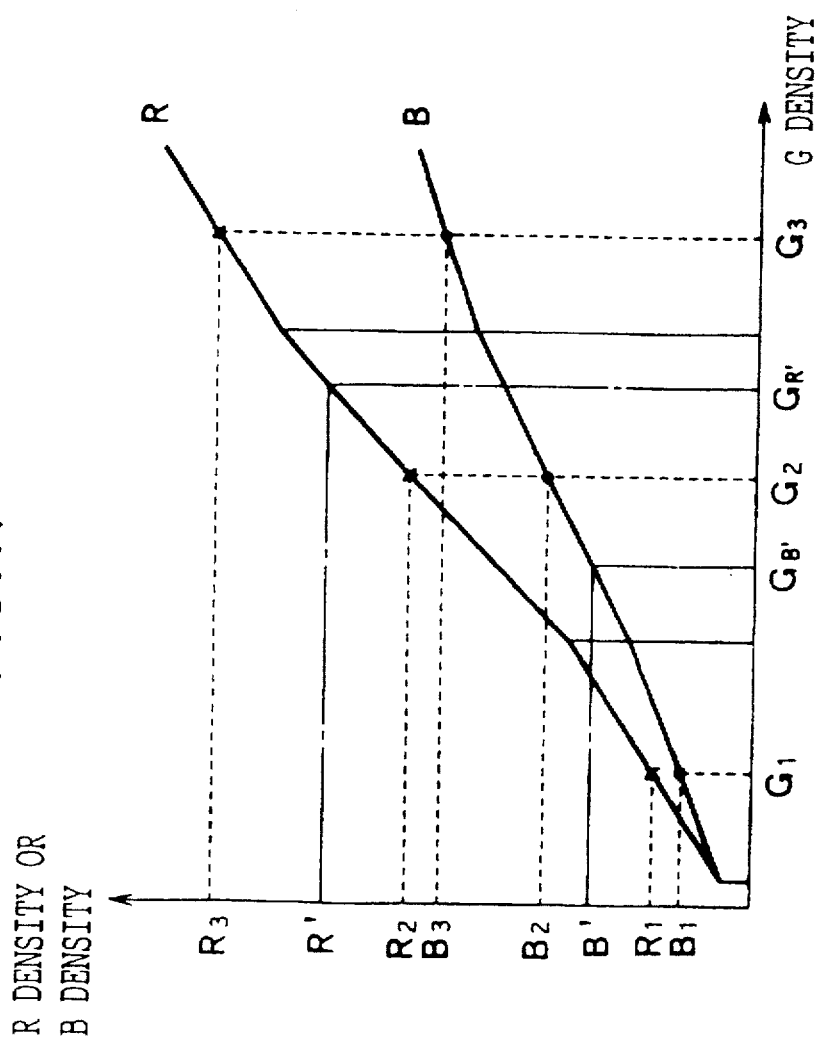
FIG. 11 is a diagram illustrating a normalization table for normalizing photomeric data.

First, the sets of tricolor corrected photomeric data are calculated by subtracting the low-density-portion photomeric data from each of the multiplicity of sets of tricolor photomeric data. As the low-density-portion photomeric data, it is possible to use the photomeric data on a reference negative film or a base portion of the film including a film frame. Next, as shown in FIG. 11, the sets of photomeric data on B and R are normalized by being transformed into the density of G by using predetermined normalization curves (or a normalization table), so as to obtain sets of normalized photomeric data on B, R, and G. The reason for normalizing the photomeric data in this way is that since the film density of the negative film varies due to the difference in film type and the difference in development processing, the difference in density is corrected by this normalization, and the photomeric data is transformed so as to produce a fixed density and color with respect to an identical subject irrespective of the difference in film type and development processing. As methods for this normalization, it is possible to use the methods disclosed in Japanese Patent Application Laid-Open Nos. 1039/1981, 273532/1986, and 144158/1987.

Pixels are selected in an ensuing Step 138, and the characteristic amount of the image is calculated from the selected pixels in Step 140. As the characteristic amount of the image, it is possible to use a maximum density, a minimum density, or an average density of the overall plane or a specific region of the original image, or an average density of a facial region of a human character, or the like. The selection of the pixels corresponds to the extraction of image data on the original image to be printed.

Figure 12:
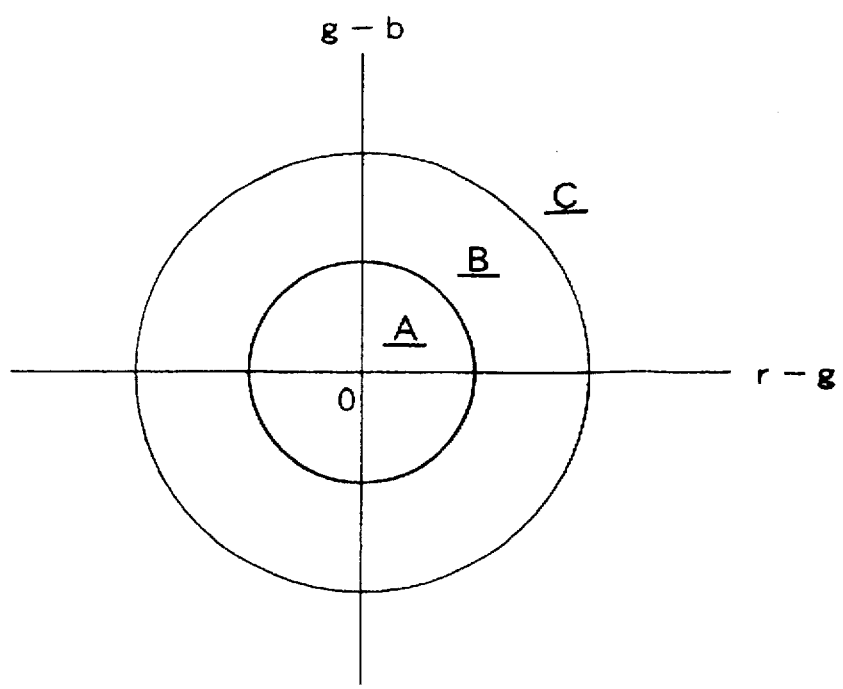
FIG. 12 is a diagram illustrating color coordinates for classifying tricolor normalized data.

In the selection of pixels, first, as shown in FIG. 12, tricolor normalized data is classified by determining to which color region the tricolor normalized data belongs, among a color region A including the origin, a color region B excluding the color region A and falling in a predetermined range of color difference, and a color region C excluding the color regions A and B, these regions being set on color coordinates with the difference, R–G, between the normalized data R and G taken as the abscissa and the difference, G–B, between the normalized data G and B taken as the ordinate. In accordance with this classification of the tricolor normalized data, the classification of photomeric data, i.e., the classification of pixels, is carried out.

The sets of tricolor normalized data are classified with the boundary between the color regions A and B and the boundary between the color regions B and C serving as lines of demarcation. Hence, the sets of tricolor normalized data are classified into data belonging to a region where the color difference from a reference value (origin) is small, data belonging to a region where the color difference from the reference value is medium, and data belonging to a region where the color difference from the reference value is large. In this embodiment, in Step 138, the photometric data whose normalized data belongs to any one of the color regions A, B, and C, i.e., the pixels, are classified and selected as the photomeric data used in later processing. In addition, in Step 140, the average density of the overall plane or a specific region of the original image is determined for each color (R, G, B), the number of photometric data (pixels) selected after classification and belonging to each region is determined, and the integral density value of photometric data belonging to each color region is calculated.

As for the technique for selecting the pixels and calculating the characteristic amount of the image in the above-described manner, it is possible to use the method disclosed in Japanese Patent Application Laid-Open Nos. 198144/1986 and 232442/1986, or the like.

In an ensuing Step 142, transformed data is generated by transforming the characteristic amount of the image determined in Step 140 by using the transformation table determined in Step 128. In an ensuing Step 144, the film characteristic data stored in the first memory is read. In an ensuing Step 146, an image determining amount ΔRGB for determining the presence of an abnormal frame is determined by using the transformed data and the film characteristic data and by referring to Formula (3) below, so as to determine whether or not the print frame is an abnormal frame on the basis of whether the image determining amount ΔRGB is greater than or equal to a predetermined value (in this embodiment, 0.10).

$$\Delta RGB = \{(Ra-Ga)^2+(Ga-Ba)^2\}-\{(Rm-Gm)^2+(Gm-Bm)^2\}$$

or $$\Delta RGB = \{|Ra-Ga|+|Ga-Ba|\}-\{|Rm-Gm|+|Gm-Bm|\} \quad (3)$$

where,

Ra, Ga, Ba: image data (transformed data on the characteristic amount of the image) stored in the third memory Rm, Gm, Bm: film characteristic data stored in the first memory As a result of determination in Step 146, coefficients k1, k2, and k3 of an exposure-calculating formula (4) shown below are determined in an ensuing Step 148 so as to determine the exposure-calculating formula.

$$D = (k1 \cdot SDA + k2 \cdot SDB + k3 \cdot SDC)/(k1 \cdot NA + k2 \cdot NB + k3 \cdot NC) \quad (4)$$

where,

D: density

SDA: integral density value of pixels included in the region A

SDB: integral density value of pixels included in the region B

SDC: integral density value of pixels included in the region C

NA: number of pixels included in the region A

NB: number of pixels included in the region B

NC: number of pixels included in the region C

For example, the aforementioned coefficients are determined such that if ΔRGB<0.10, then k1=10, k2=10, and k3=0, and if ΔRGB≧0.10, then k1=10, k2=10, and k3=10.

Then, in an ensuing Step 150, the exposure amount is determined by a density value determined by the exposure-calculating formula using the determined coefficients. In Step 152, exposure is effected by controlling the light-adjusting filter 60 in correspondence with the exposure amount thus determined, thereby producing a print. In Step 154, a determination is made as to whether or not the exposure of one film has been completed. If the exposure of one film has not been completed, the operation returns to Step 130 to repeat the above-described processing. Meanwhile, if the exposure of one film has been completed, in Step 156, the data stored in the first memory and the third memory of the photometric data memory 30 is cleared so as to effect the exposure processing of an ensuing film.

Thus, in a case where the amount for determining the image ΔRGB<0.10, a determination is made that the print frame is not an abnormal frame, and pixels exhibiting high saturation are not used in the determination of the exposure amount. Hence, it is possible to prevent color failure. Meanwhile, if ΔRGB≧0.10, a determination is made that the print frame is an abnormal frame, and pixels exhibiting high saturation are also used in the determination of the exposure amount. Consequently, it is possible to determine the exposure amount in such a manner as to correct a color change in the original image included in a film which has undergone deterioration over time, a color change in the original image included in a film photographed with a photographing light source other than daylight, and a color change in the original image included in a film exhibiting variations in characteristics.

The degree of color correction can be altered by changing the values of the coefficients k1, k2, and k3 determined above.

Figure 13:
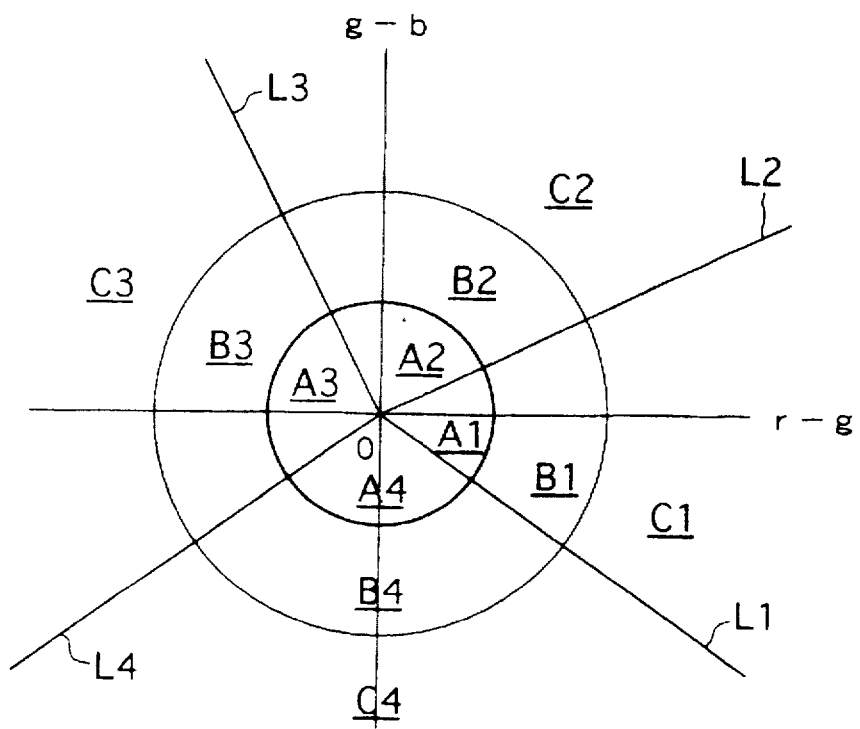
FIG. 13 is a diagram illustrating other color coordinates for classifying tricolor normalized data.

Incidentally, although a description has been given above of the case where the color regions on the color coordinates in the selection of pixels are classified into three kinds, it goes without saying that the color regions may be further divided into smaller segments. For example, as shown in FIG. 13, the color regions may be further divided by straight lines L1, L2, L3, and L4 with the original set as a visual point on the color coordinates shown in FIG. 12. That is, the color region A in FIG. 12 is further divided into color regions A1, A2, A3, and A4, the color region B into color regions B1, B2, B3, and B4, the color region C into color regions C1, C2, C3, and C4, and the color region D into color regions D1, D2, D3, and D4. The tricolor normalized data is classified by determining to which of these color regions the tricolor normalized data belongs, and the photomeric data is classified (the pixels are classified) in accordance with this classification of the tricolor normalized data. If this procedure is taken, it becomes easy to distinguish a discrepancy between a vivid color of the subject which is liable to cause color failure and a color due to a photographing light source or a change in film characteristics. Further, even if the amount for determining the image ΔRGB≧0.10, pixels of red and pixels of yellow can be conditionally excluded from the pixels for determining the exposure amount. Hence, even if the print frame is determined to be an abnormal frame, it is possible to obtain a high-quality print even with respect to a red or yellow subject.

In addition, the determination of the exposure amount is not limited to the above-described method, and it is possible to use, for instance, the following Formula (5):

$$Di = Dpi - Dni$$

$$Dw = (\Sigma Di)/3$$

$$\log Ei = Si \cdot \{Ci(Di - Dw) + Dw\} \quad (5)$$

where,

Dpi: image density of the original image of the print frame

Dni: image density of the original image of the reference film

Ci: coefficient of color correction

Si: slope control value (When Di<0, an under slope coefficient is used; when Di≧0, an over slope coefficient is used)

Ei: exposure amount i: any one of R, G, and B

As the aforementioned image density, it is possible to use, for instance, an average density of the overall image plane, a maximum density of a neutral color in the image, or the like. In the above-described case, when $\Delta RGB<0.10$, a determination is made that $Ci=0.6$ (normal correction value), whereas if $\Delta RGB \geqq 0.10$, a determination is made that $Ci=1.0$ (high correction value).

In addition, it is possible to use the following Formula (6) instead of the aforementioned Formula (5):

$$Di=Dpi-Dni$$

$$Dpi=Ka \cdot D0 + Kb \cdot D1$$

$$Dw=(\Sigma Di)/3$$

$$\log Ei = Si \cdot \{Ci(Di-Dw)+Dw\}+Cb \quad (6)$$

where,

Dpi: image density of the original image of the print frame (density for determining exposure amount for copying)

Dni: image density of the original image of the reference film

Ci: coefficient of color correction

Si: slope control value (When $Di<0$, an under slope coefficient is used; when $Di \geqq 0$, an over slope coefficient is used)

Ei: exposure amount i: any one of R, G, and B

Ka, Kb: coefficients (e.g., 0.5, respectively)

D0: image data on the original image of the print frame

D1: data stored in the memory

Cb: constant

The aforementioned image density is determined in the same manner as described above.

The coefficients k1, k2, and k3 are determined by the color characteristics of the original image, but the coefficients Ka and Kb are determined as follows in accordance with the values of the amounts for determining the image:

If $\Delta RGB>0.14$, $Ka=0.9$, $Kb=0.1$

If $0.14 \geqq \Delta RGB>0.10$, $Ka=0.7$, $Kb=0.3$

If $0.10 \geqq \Delta RGB$, $Ka=0.7$, $Kb=0.3$

A function may be determined in advance with respect to the amount for determining the image ARGB, and a value obtained from that function may be used as each of these coefficients Ka and Kb.

In addition, the coefficients Ka and Kb may be determined on the basis of color characteristics of the original image (e.g., the number of pixels NA, NB, NC, etc.). For example, in a case where the amount for determining the image $\Delta RGB>0.14$, and the number of pixels in the color region of tungsten color is numerous, it can be determined that the photographing was carried out with a tungsten light source, and it is possible to use coefficients for the tungsten light source prepared in advance.

If these coefficients are used as exposure parameters, and common values are used for the original images of one film or a series of films, it is possible to suppress variations in color and density with respect to one film or a series of films, thereby making it possible to obtain prints of fixed and excellent finish. A method of determining identical exposure parameters may be used for these exposure parameters. In this method of determining identical exposure parameters, when exposure parameters are determined by a functional formula, if the amount for determining the image $\Delta RGB$ is large, a high value is sometimes used for an initial value or a constant in the functional formula, and common values are used for the print frames included in one film or a series of films.

In the above-described example, the calculation of the first average image data is carried out after the transport of the negative film in the first direction and the storage of the photomeric data on the original images for the respective frames, and before a start of the transport of the negative film in the second direction. However, it is possible to adopt various modifications, such as an irregular method in which, by using the first average image data calculated from photomeric data on frames in a latter half portion of one negative film, the first average image data determined from the photomeric data on a first half portion during the transport in the second direction is added to the first average image data determined from the photomeric data on the frames of the latter half portion.

Although in the above-described embodiment the sets of photomeric data are stored for each frame, an arrangement may be provided such that a characteristic amount of the image representing the characteristics of the original image concerning the color characteristics and the density described above is generated from the sets of photomeric data during photometry, and the generated characteristic amount of the image is stored for each frame. Still alternatively, an arrangement may be provided such that the color of each pixel is determined, and the pixels classified on the aforementioned color coordinates (FIG. 12 or the like) concerning the determined color may be selected and stored.

Thus, in this embodiment, the relationship between the image data corresponding to the film type of the negative film 20 and the film characteristic data on the negative film 20 including print frames is determined from the film characteristic data stored in the second memory in which a multiplicity of pieces of data capable of being used as average data are stored and from the image data stored in the fourth memory. For this reason, the film characteristic data on the negative film 20 including print frames and the image data to be compared therewith can be handled as data obtained from a multiplicity of pieces of image data, i.e., data on an image photographed in daylight, so as to determine an abnormal frame. Since the exposure amount is determined from the result of this determination, the original image can be printed as if the image was photographed in daylight.

In addition, if it is determined from the amount for determining the image that the print frame is not an abnormal frame, pixels exhibiting high saturation are not used in the determination of the exposure amount, thereby making it possible to prevent color failure. Meanwhile, if it is determined that the print frame is an abnormal frame, the pixels exhibiting high saturation are also used in the determination of the exposure amount. Hence, it is possible to determine the exposure amount in such a manner as to correct a color change in the original image included in a film which has undergone deterioration over time, a color change in the original image included in a film photographed with a photographing light source other than daylight, and a color change in the original image included in a film exhibiting variations in characteristics.

Figure 4A:
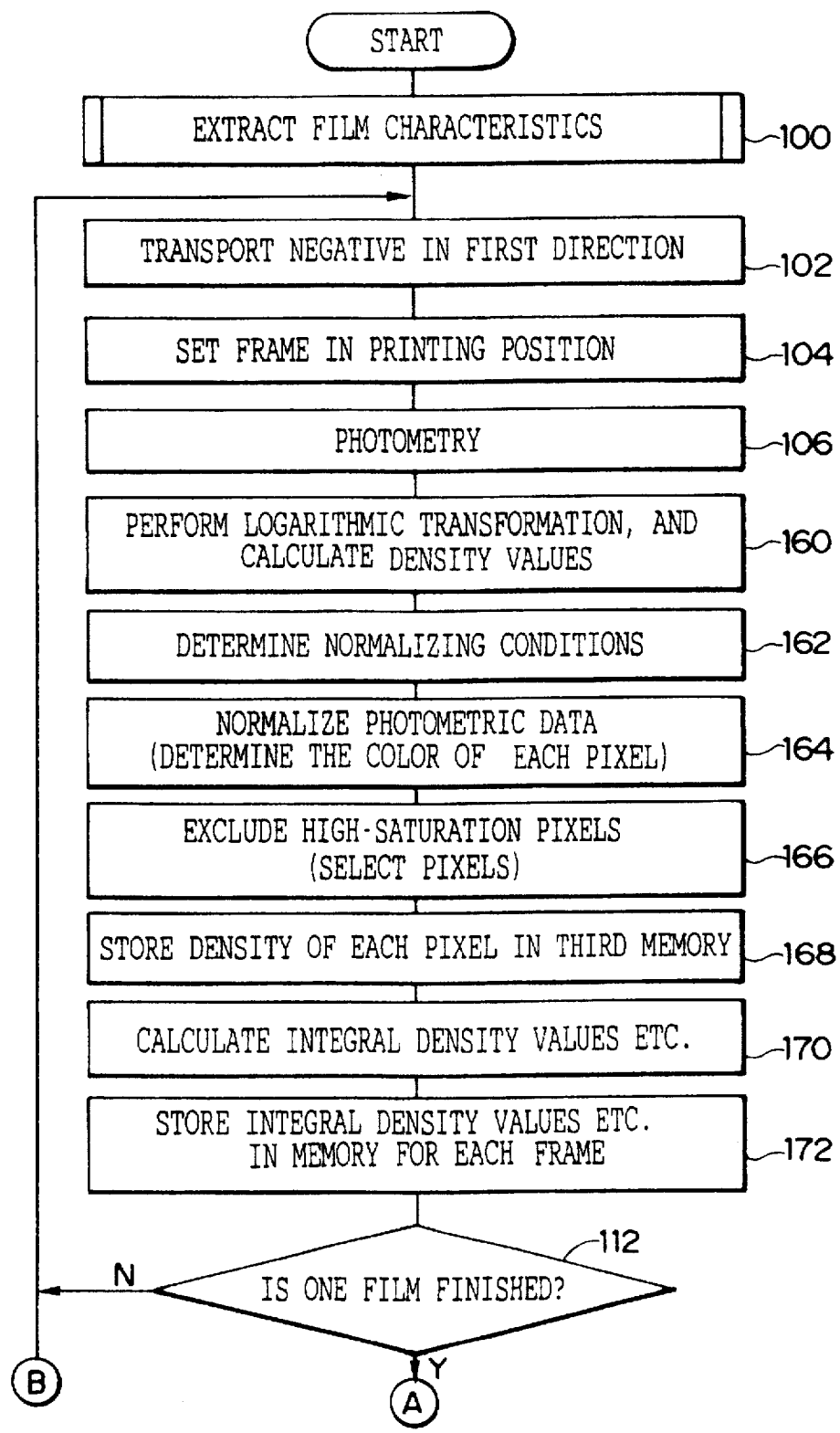
FIGS. 4A and 4B are flowcharts illustrating an exposure control routine in accordance with a second embodiment.
Figure 4B:
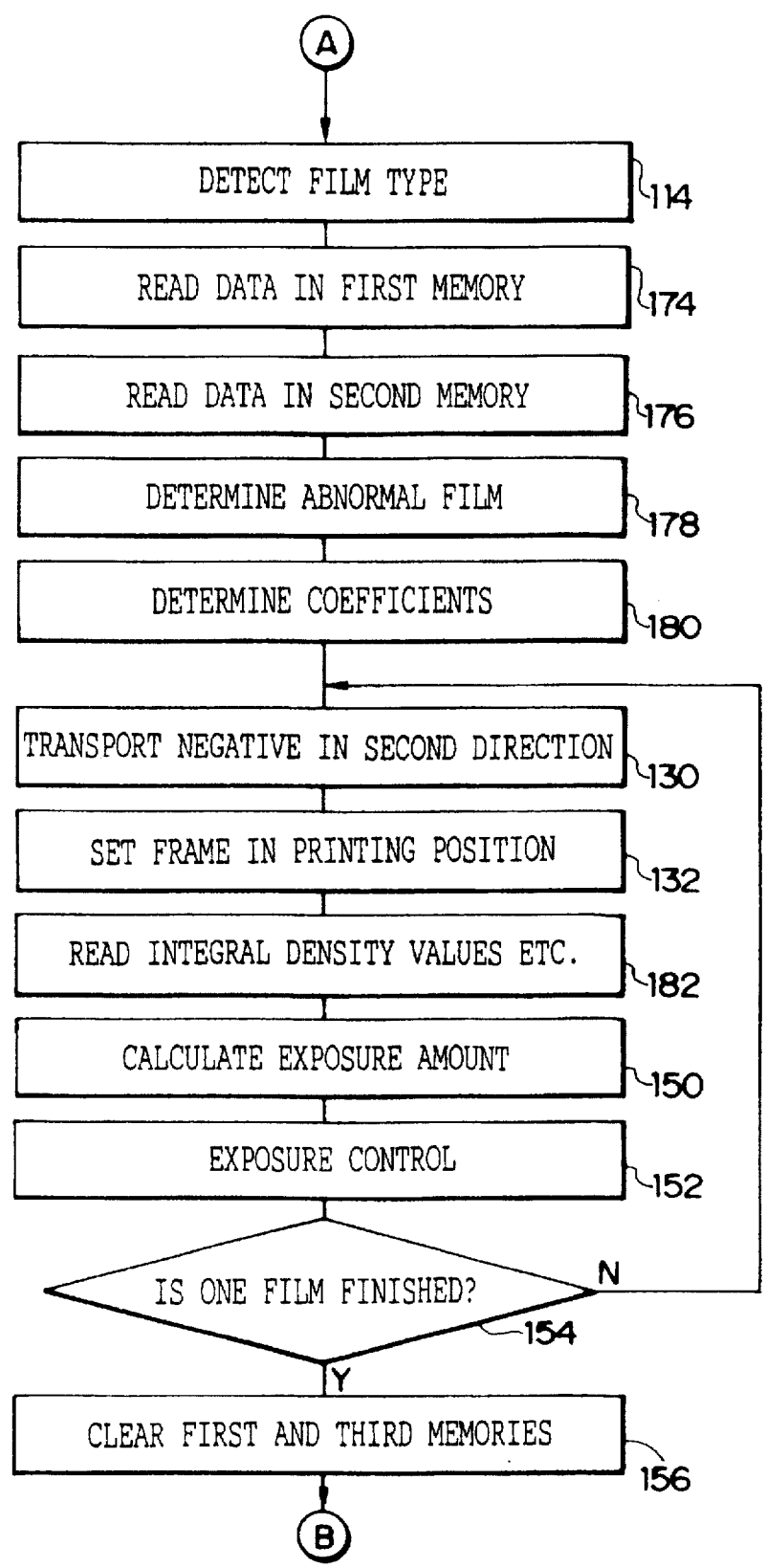

Next, a description will be given of a second embodiment with reference to an exposure control routine shown in FIGS. 4A and 4B. In this embodiment, an exposure-calculating formula is determined on the basis of data in the first memory, which is film characteristic data on one film or a series of films including print frames, and data in the second memory, which is film characteristic data on a multiplicity of films of the same kind of film. Since this embodiment is configured substantially in the same way as the foregoing embodiment, identical portions will be denoted by the same reference numerals, and a detailed description thereof will be omitted.

In Step 160, all the sets of photometric values (photometric values concerning all the pixels) of the original image photometrically measured in Step 106 are subjected to logarithmic transformation, and logarithmically transformed values (i.e., density values) of the photometric values are calculated as the sets of photomeric data. In an ensuing Step 162, normalizing conditions for normalizing the sets of photomeric data are determined in the same way as in the aforementioned Steps 114 to 120. In an ensuing Step 164, the sets of photomeric data are normalized in accordance with the normalizing conditions in the same way as in the aforementioned Step 134. In this case, when the number of frames concerning the image data in the third memory is small, it is preferable to detect the film type and use data stored in the fourth memory and corresponding to that film type. Step 164 corresponds to the determination of the color of each pixel. In an ensuing Step 166, among the sets of normalized photomeric data, predetermined high-saturation pixels to be excluded are selected and excluded. In an ensuing Step 168, the density values of pixels other than the excluded pixels, i.e., the sets of photomeric data, are stored in the third memory of the photomeric data memory 30. Accordingly, the density values of pixels excluding the high-saturation pixels are stored in the third memory.

In an ensuing Step 170, integral density values used in the exposure-calculating formula (4) above and the number of pixels are determined. In an ensuing Step 172, the integral density values and the number of pixels thus determined are stored in the photomeric data memory 30. If it is determined in Step 112 that the photometry of one negative film has not been finished, the operation returns to Step 102. In this way, the density values of pixels in which high-saturation pixels are excluded from the sets of photomeric data on original images included in one negative film are stored in the memory, and integral density values and the number of pixels are stored with respect to all the sets for each frame, i.e., all the frames at least subject to copying.

In Step 114, the type of negative film is detected. In an ensuing Step 174, the film characteristic data on the negative film 20 stored in the first memory is read. In an ensuing Step 176, film characteristic data on the multiplicity of films of the same film type stored in the second memory is read. In an ensuing Step 178, by using these film characteristic data, a determination is made as to whether or not the film subject to printing is an abnormal film in the same way as the determination of an abnormal frame in Step 146 above.

The development characteristics, film characteristics, and film characteristics of a negative film which has undergone a change due to extended storage are reflected on the film characteristic data stored in the first memory. In addition, since the film characteristic data stored in the second memory is an average of the film characteristic data stored in the first memory, the development characteristics, film characteristics, and a change due to extended storage can be detected by comparing the film characteristic data between the first memory and the second memory. Incidentally, variations in the film characteristic data can be estimated if an arrangement is provided such that data on management of the exposure apparatus for exposing the reference image and an ID indicating the laboratory or the like where the reference image was exposed can be detected. Accordingly, if the development characteristics, film characteristics, and a change due to extended storage are detected, and a determination is made that the film is an abnormal film, it suffices if the parameters are set in such a manner that the color correction is made high. In a case where the exposure amount is determined on the basis of a value which is obtained by setting weighting coefficients to be imparted respectively to the film characteristic data which is data from the first memory, the image data which is data from the third memory, and the photomeric data on the print frame, by adding the data after imparting thereto the weighting coefficients set for the respective data, then the exposure amount may be determined by setting the weighting coefficients such that the weight becomes large with respect to at least one item of data among the film characteristic data which is data from the first memory, the image data which is data from the third memory, and the photomeric data on the print frame.

In this embodiment, the amount for determining the image $\Delta RGB$ is determined by referring to Formula (3) above by using the film characteristic data in the first memory read in Step 174 and the film characteristic data in the second memory read in Step 176, and a determination as to whether or not the film is an abnormal film is made on the basis of whether or not the amount for determining the image $\Delta RGB$ is greater than or equal to a predetermined value (0.10).

As a result of this determination, in an ensuing Step 180, an exposure-calculating formula is obtained by determining the coefficients k1, k2, and k3 of the aforementioned exposure-calculating Formula (4) or the coefficients k1, k2, k3, Ka, and Kb of the aforementioned exposure-calculating Formula (6), in the same way as in Step 148 above.

Next, the negative film is transported, and the frame is set in the printing position (Steps 130, 132). In an ensuing Step 182, the integral density value and the number of pixels of the frame (print frame) are read from the memory. Then, exposure is effected by controlling the light-adjusting filter 60 in correspondence with an exposure amount based on a density value obtained from the exposure-calculating formula using the determined coefficients (Steps 150, 152).

Thus, in this embodiment, an abnormal film is distinguished on the basis of the stable film characteristic data corresponding to the type of one film or a series of films as well as the film characteristic data on the film to be printed. For this reason, those negative films whose film characteristics have changed during their storage in an unphotographed state, due to such as the expiration of the effective period, being left for extended periods at a high temperature or under high humidity, and fogging by radioactive rays, can be accurately distinguished as abnormal films having characteristics different from those of the multiplicity of films. In addition, those films whose film characteristics differ from those of a multiplicity of films, due to such as variations in the emulsion number (lot number), variations in the lot, variations in manufacture, and variations in development processing, can be accurately distinguished as being abnormal films.

For this reason, when the film is not an abnormal film, high-saturation pixels are not used in the determination of exposure amount, thereby making it possible to prevent color failure. Meanwhile, when the film is an abnormal film, high-saturation pixels are used in the determination of exposure amount, so that the exposure amount can be determined in such a manner as to correct a color change in the original image included in a film whose film characteristics have changed and a color change in the original image included in a film exhibiting variations in characteristics.

Even with respect to films which have slightly deteriorated over time and films whose film characteristics are different from those of a multiplicity of films, it is possible to adopt an intermediate value between that of a normal film and that of an abnormal film, so that a satisfactory color correction value can be determined. As a result, it is possible to determine the exposure amount properly with respect to all the films, making it possible to produce high-quality prints.

Further, it is possible to produce high-quality prints with uniform print quality with respect to one film or a series of films or between films.

Furthermore, in this embodiment, since pixels corresponding to a high-saturation subject are excluded in the first average image data obtained from the data in the third memory, the first average image data is obtained with high accuracy even with respect to negative films including numerous subjects with biased colors. Consequently, the exposure amount can be determined with high accuracy, thereby making it possible to produce high-quality prints.

Figure 5A:
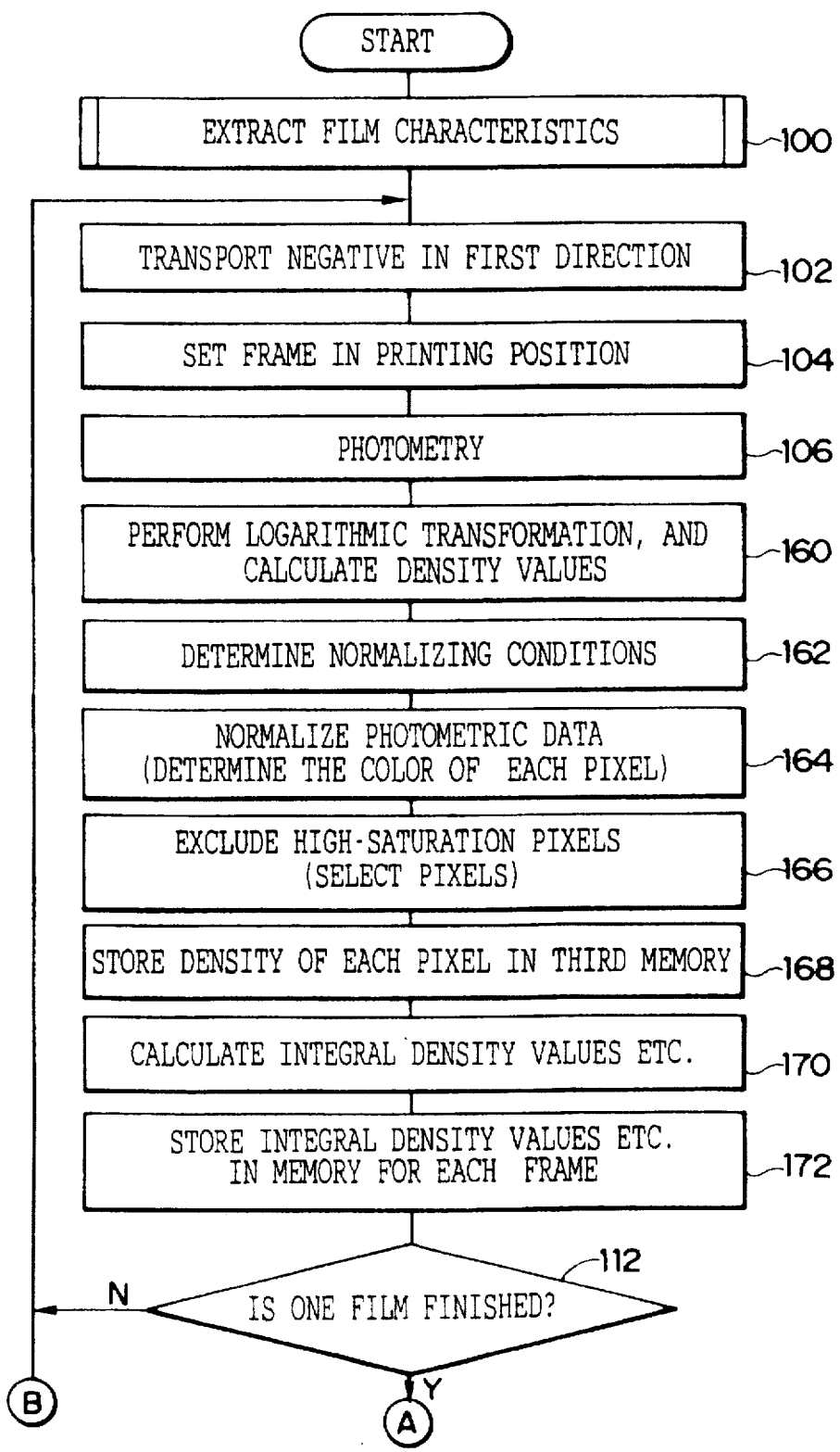
FIGS. 5A and 5B are flowcharts illustrating an exposure control routine in accordance with a third embodiment.

Next, a description will be given of a third embodiment with reference to an exposure control routine shown in FIGS. 5A and 5B. In this embodiment, an exposure-calculating formula is determined on the basis of data in the first memory which is the film characteristic data on one film or a series of films including print frames and data in the third memory which is the first average image data, i.e., average image data on original images of print frames included in the film to be printed. In the exposure control routine in accordance with this embodiment, instead of Step 176 in FIG. 4B, Step 186 for reading data in the third memory which is the first average image data is executed. Since this exposure control routine is configured in a substantially similar manner to the exposure control routine shown in FIGS. 4A and 4B, identical portions are denoted by the same reference numerals, and a detailed description thereof will be omitted.

Figure 5B:
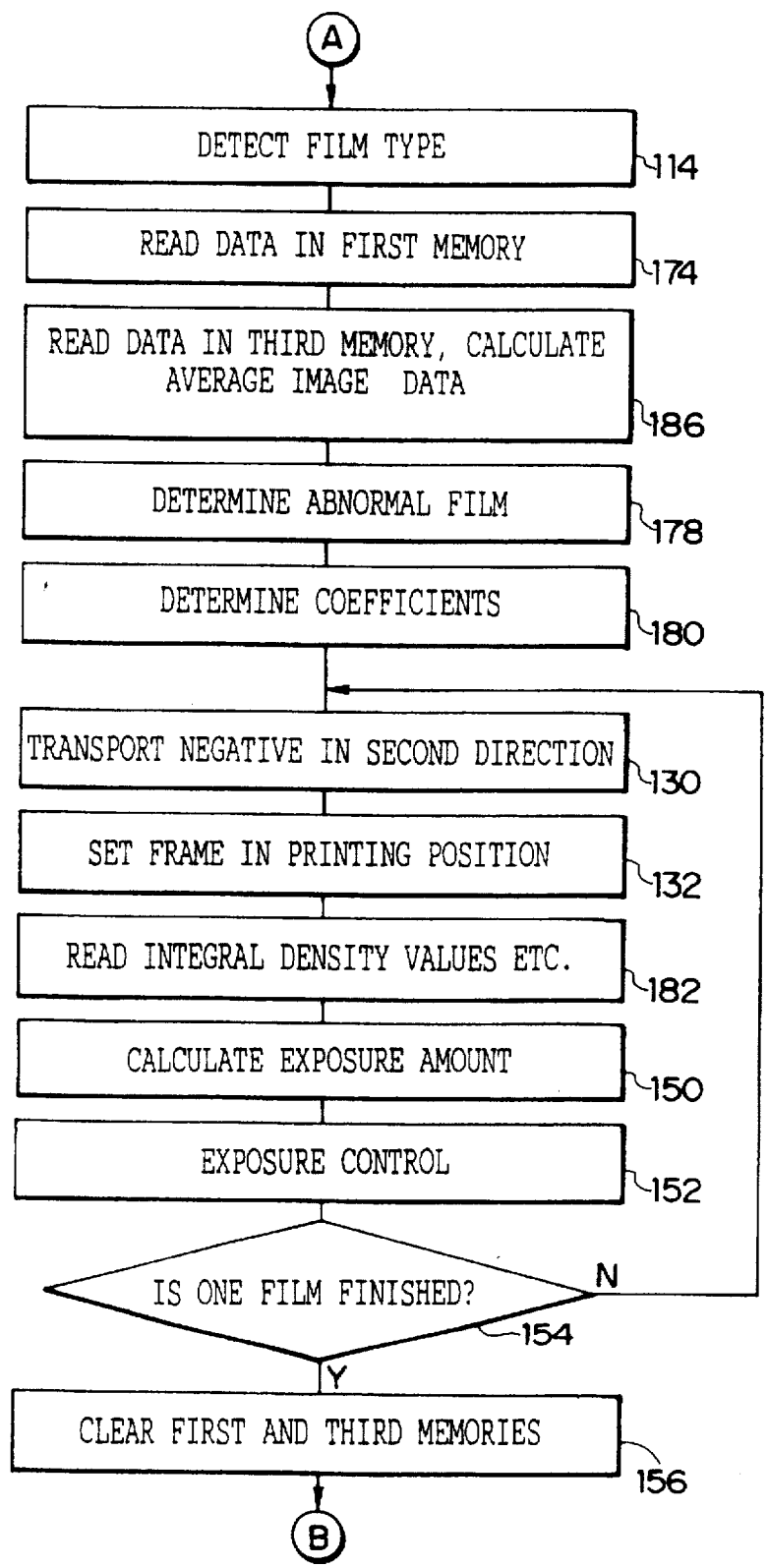

In Step 186 in FIG. 5B, image data on the negative film 20 stored in the third memory is read, and the first average image data is calculated. In an ensuing Step 178, a determination is made as to whether or not the negative film to be printed is an abnormal film by using the film characteristic data determined in Step 174 and the first average image data determined in Step 184.

There is a possibility that the first average image data based on the image data stored in the third memory has been further affected by a change in the latent image over time, a difference in the photographing light source, or variations in image data as compared with the film characteristics based on the film characteristic data stored in the first memory. Accordingly, by making comparison between the film characteristic data stored in the first memory and obtained from the reference image recorded on the film to be printed and the average image data stored in the third memory, it is possible to detect a change in the latent image over time, a difference in the photographing light source, and variations in image data.

The variations in image data occur when the number of frames in one film is small and when the color of the original images on one film is biased, i.e., when a certain color predominates (e.g., in a case where most subjects in one film are subjects of green color). Whether or not the number of frames is small can be detected by detecting the DX code or a notch. In addition, the effect due to variations in the image data or the effect due to a photographing light source can be detected by analyzing the color of the sets of photomeric data on print frames, i.e., the color of the original images. Further, the effect due to variations in the image data or the effect due to the fading of the latent image can be estimated by comparing the film characteristic data stored in the first memory and the color balance of the image data with respect to the gradation or density. In this estimation, it is preferable to cause the film characteristic data to correspond to the image data by the use of the transformation formula shown in Formula (2) or a transformation table. If the fading of the latent image, the effect due to the photographing light source, or variations in the image data are thereby detected and a determination is made that the film is an abnormal film, it suffices if the parameters are set in such a way that the color correction becomes high. In addition, in the same way as the above-described embodiment, the exposure amount may be determined by setting weighting coefficients such that the weight becomes large with respect to at least one item of data among the film characteristic data which is data from the first memory, the image data which is data from the third memory, and the photomeric data on the print frame.

Thus, in this embodiment, an abnormal film is determined on the basis of the film characteristic data on one film or a series of films and the film characteristic data on the film to be printed. For this reason, those negative films which have undergone deterioration over time with changes in their film characteristics during the storage of the films due to such as the fading of latent images and fogging by radioactive rays, can be accurately distinguished as abnormal films different from films estimated from the film characteristic data obtained from the reference image. In addition, those negative films which have undergone a color change, due to a photographing light source other than daylight, a change in the color temperature of the photographing light source such as the winter sun and a shade, or a color change due to film characteristics such as variations in the image data, can be accurately distinguished as abnormal films different from films which can be estimated from the film characteristic data obtained from the reference image.

For this reason, if the film is not an abnormal film, high-saturation pixels are not used in the determination of the exposure amount, thereby making it possible to prevent color failure. Meanwhile, the high-saturation pixels are also used in the determination of the exposure amount in the case of an abnormal film. Hence, it is possible to determine the exposure amount in such a manner as to correct a color change in the original image included in a film which has undergone deterioration over time, a color change in the original image included in a film photographed with a photographing light source other than daylight, and a color change in the original image included in a film exhibiting variations in characteristics.

Figure 6A:
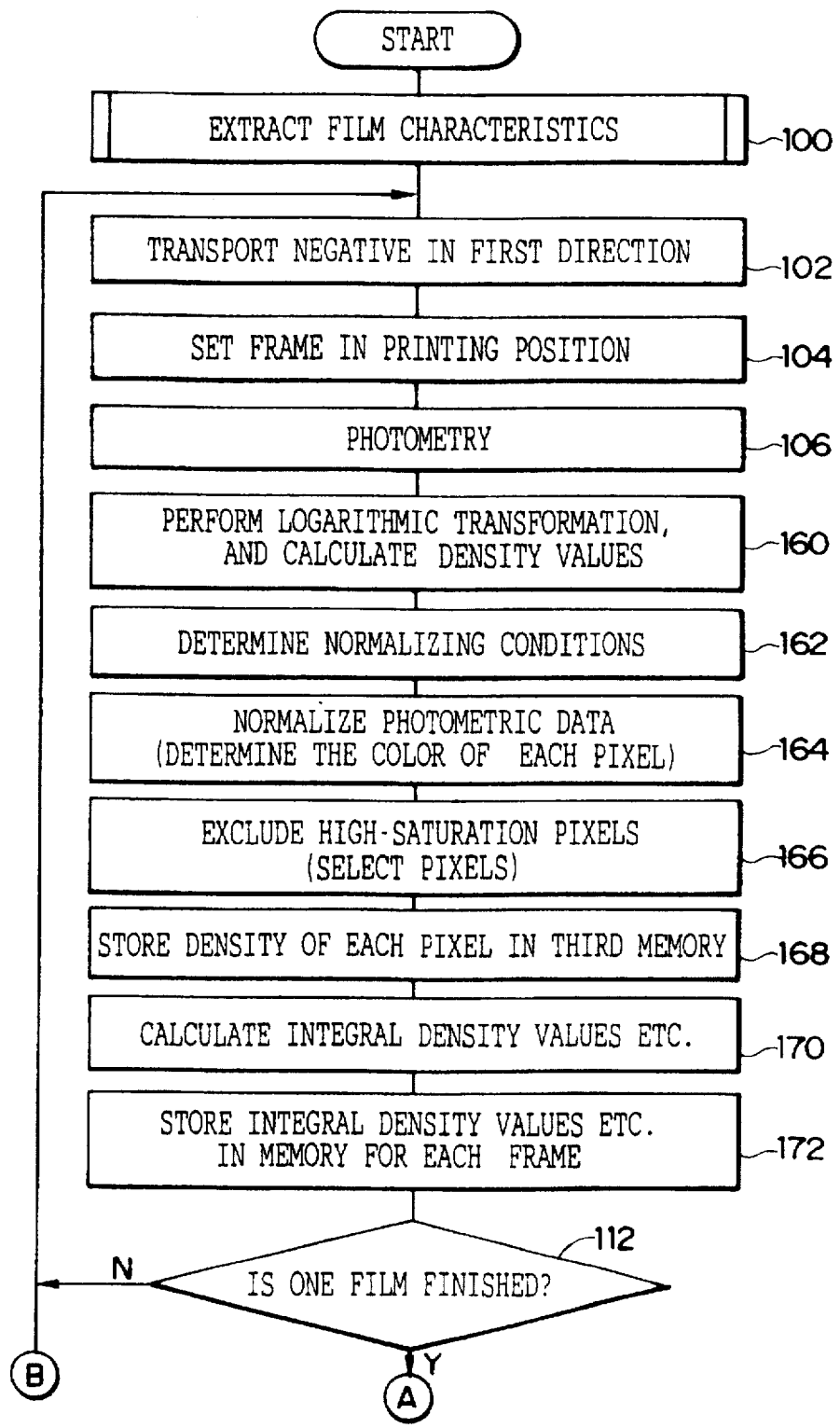
FIGS. 6A and 6B are flowcharts illustrating an exposure control routine in accordance with a fourth embodiment.

Next, a description will be given of a fourth embodiment with reference to an exposure control routine shown in FIGS. 6A and 6B. In this embodiment, an exposure-calculating formula is determined on the basis of data in the second memory which is the film characteristic data on a multiplicity of films of the same film type as the film to be printed and data in the third memory which is the first average image data, i.e., average image data on original images of print frames included in the film to be printed. In the exposure control routine in accordance with this embodiment, instead of Step 174 in FIG. 5B, Step 184 for reading data in the second memory is executed. Incidentally, since this exposure control routine is configured in a substantially similar manner to the exposure control routine shown in FIGS. 4A and 4B, identical portions are denoted by the same reference numerals, and a detailed description thereof will be omitted.

Figure 6B:
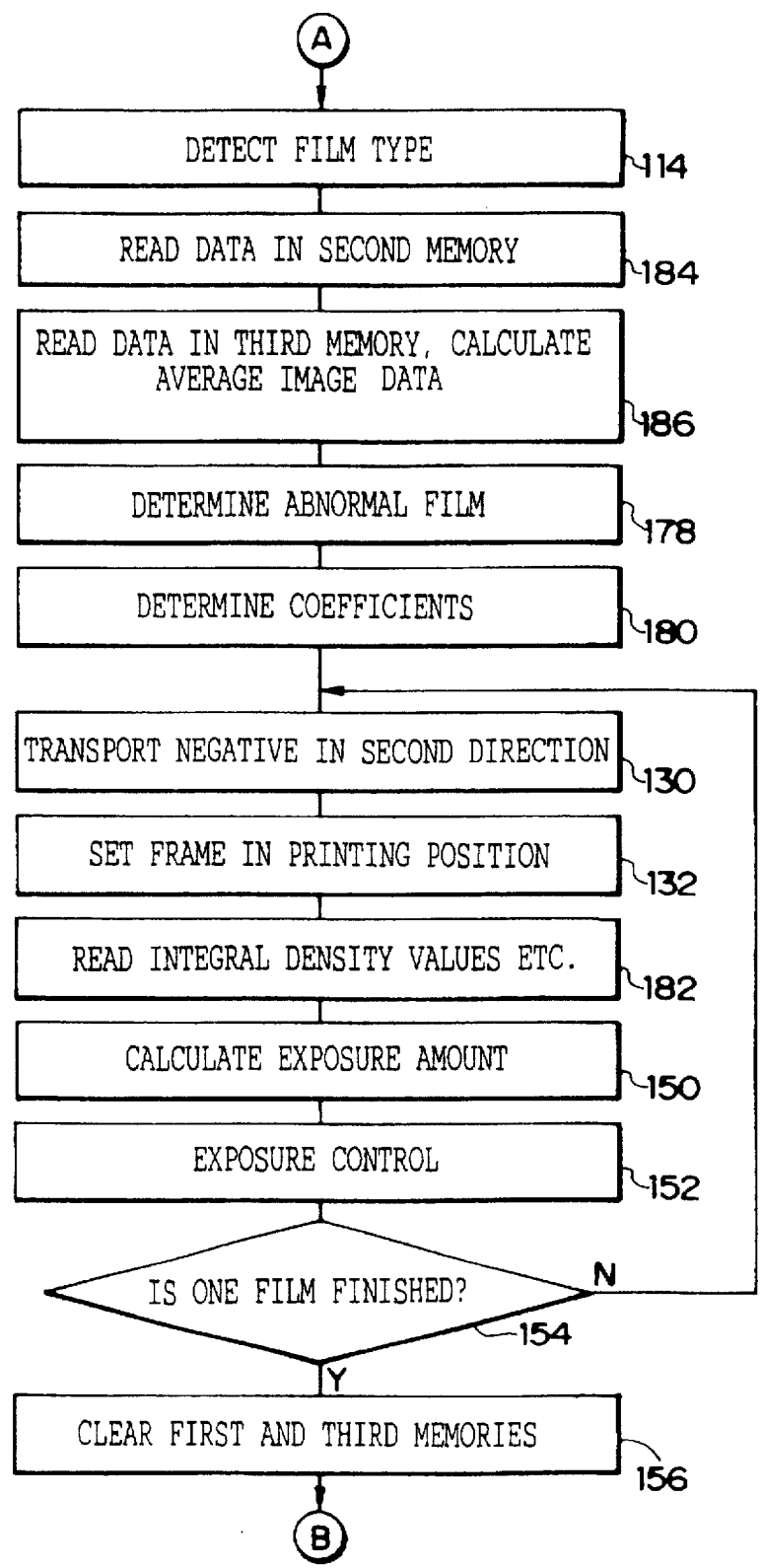

In Step 184 in FIG. 6B, the film characteristic data on the multiplicity of films of the same film type stored in the second memory is read. In an ensuing Step 186, the image data on the negative film 20 stored in the third memory is read to calculate the first average image data. In an ensuing Step 178, by using the film characteristic data and the average image data, a determination is made as to whether or not the negative film to be printed is an abnormal film.

Since the film characteristic data stored in the second memory is film characteristic data concerning a multiplicity of films of the same film type, the film characteristic data is average data affected by variations in manufacture peculiar to the film type and variations in development. Meanwhile, the average image data stored in the third memory may have been affected by the fading of latent images or the photographing light source as described above, and may also have been affected by development processing. Accordingly by comparing the film characteristic data on the multiplicity of films in the second memory with the average image data on the print film in the third memory, it is possible to detect the transformation of film characteristics due to a change over time, a photographing light source, or development processing. Incidentally, as for the average image data stored in the third memory, it is preferable to cause the film characteristic data to correspond to the image data by the use of the transformation formula shown in Formula (2) or a transformation table, as described in the third embodiment. If a color change due to storage over time, a color change due to the photographing light source, or a change in film characteristics due to development processing is thereby detected and a determination is made that the film is an abnormal film, it suffices if the parameters are set in such a way that the color correction becomes high. In addition, in the same way as the above-described embodiment, the exposure amount may be determined by setting weighting coefficients such that the weight becomes large with respect to at least one item of data among the film characteristic data which is data from the first memory, the image data which is data from the third memory, and the photomeric data on the print frame.

Thus, in this embodiment, an abnormal film is determined on the basis of the film characteristic data on a multiplicity of films of the same film type and the film characteristic data on the film to be printed. For this reason, those negative films whose film characteristics have changed during their storage, due to such as the expiration of the effective period, the fading of latent images, being left for extended periods at a high temperature or under high humidity, and fogging by radioactive rays, can be accurately distinguished as abnormal films having characteristics different from those of the multiplicity of films. In addition, those films whose film characteristics differ from those of a multiplicity of films, due to such as a photographing light source other than daylight, a change in the color temperature of the photographing light source such as the winter sun and a shade, variations in the emulsion number (lot number), variations in the lot, variations in manufacture, and variations in development processing, can be accurately distinguished as being abnormal films.

Figure 7A:
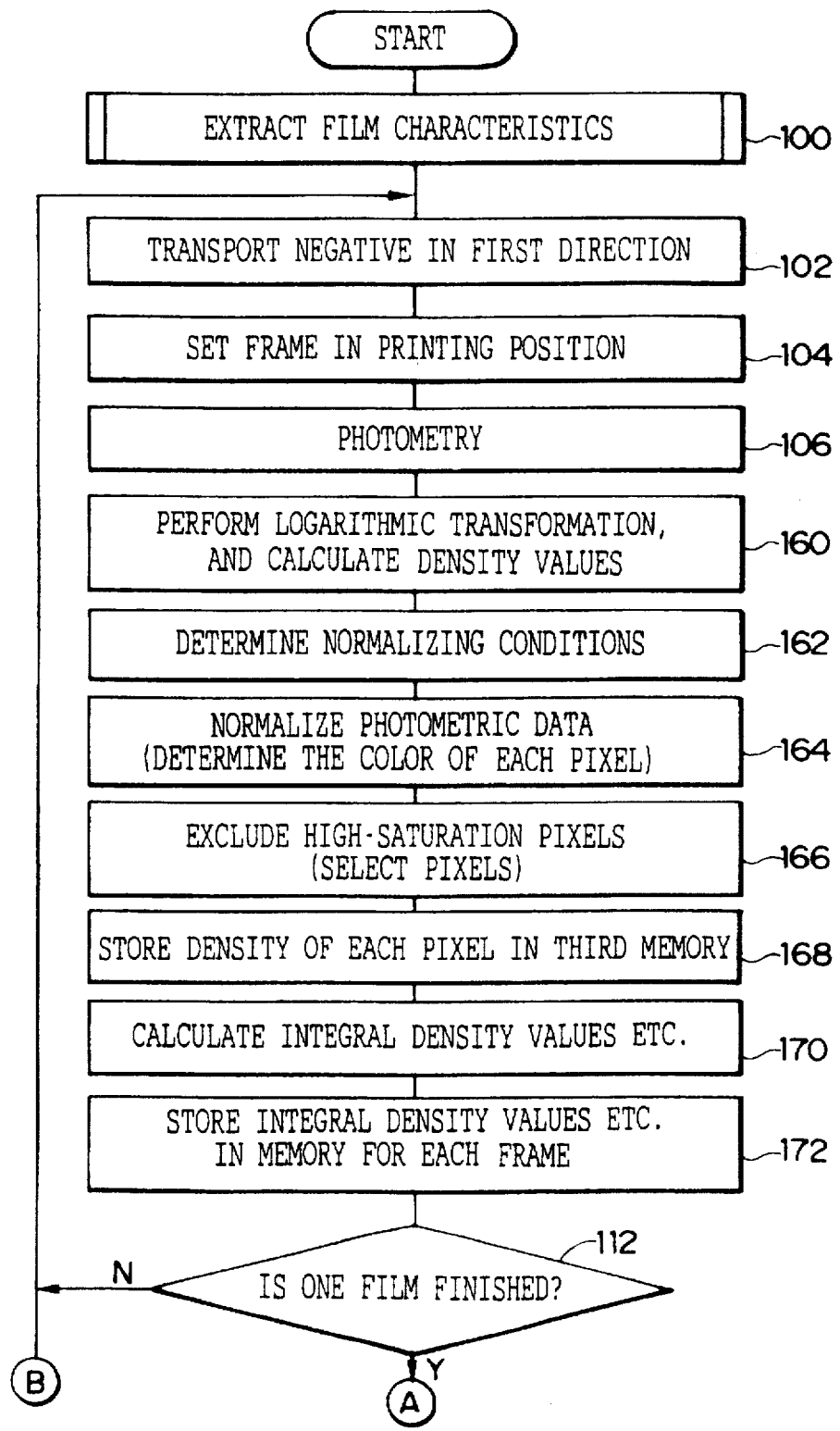

Next, a description will be given of a fifth embodiment with reference to an exposure control routine shown in FIGS. 7A and 7B. In this embodiment, an exposure-calculating formula is determined on the basis of data in the first memory which is the film characteristic data on the film to be printed, data in the third memory which is the first average image data, i.e., average image data on original images of print frames included in the film to be printed, and image data on the print frame. Incidentally, since this exposure control routine is configured in a substantially similar manner to the exposure control routine shown in FIGS. 5A and 5B, identical portions are denoted by the same reference numerals, and a detailed description thereof will be omitted.

In Step 114 in FIG. 7B, the type of negative film is detected. In an ensuing Step 174, the film characteristic data on the negative film 20 stored in the first memory is read. In an ensuing Step 186, the image data on the negative film 20 stored in the third memory is read to calculate the first average image data. In an ensuing Step 188, the image data on a print frame to be printed is read from the memory. In an ensuing Step 190, a determination is made as to whether or not the print frame is an abnormal frame by using the film characteristic data on the negative film 20 stored in the first memory, the average image data on the negative film 20 stored in the third memory, and the image data on the print frame.

As a result of the determination in Step 190, in an ensuing Step 180, an exposure-calculating formula is obtained by determining the coefficients k1, k2, and k3 of the aforementioned exposure-calculating Formula (4) or the coefficients k1, k2, k3, Ka, and Kb of the aforementioned exposure-calculating Formula (6).

Next, the negative film is transported, and the frame is set in the printing position (Steps 130, 132). In an ensuing Step 182, the integral density value and the number of pixels of the frame (print frame) are read from the memory. Then, exposure is effected by controlling the light-adjusting filter 60 in correspondence with an exposure amount based on a density value obtained from the exposure-calculating formula using the determined coefficients (Steps 150, 152). In an ensuing Step 154, a determination is made as to whether or not the exposure of one film has been completed. If the exposure of one film has not been completed, the operation returns to Step 188 to repeat the above-described processing. Meanwhile, if the exposure of one film has been completed, in Step 156, the data stored in the first memory and the third memory of the photometric data memory 30 is cleared so as to effect the exposure processing of an ensuing film.

As described above, there is a possibility that the first average image data based on the image data stored in the third memory has been further affected by a change in the latent image over time, a difference in the photographing light source, or variations in image data as compared with the film characteristics based on the film characteristic data stored in the first memory. Accordingly, by making comparison between the film characteristic data stored in the first memory and the average image data stored in the third memory, it is possible to detect a change in the latent image over time, a difference in the photographing light source, and variations in image data.

However, there are cases where a print frame undergoes a peculiar change at the time of photographing, e.g., a change in the photographing light source. Accordingly, by making a comparison with the image data on the print frame in addition to the film characteristic data stored in the first memory and the average image data stored in the third memory, it is possible to detect a change peculiar to the print frame which occurred at the time of photographing (a change in the photographing light source). Consequently, when a change in the film characteristics peculiar to the print frame due to the photographing light source is detected and the print frame is thereby determined to be an abnormal frame, it suffices if the parameters are set in such a way that the color correction becomes high. In addition, in the same way as the above-described embodiments, the exposure amount may be determined by setting weighting coefficients such that the weight becomes large with respect to at least one item of data among the film characteristic data which is data from the first memory, the image data which is data from the third memory, and the photomeric data on the print frame.

Thus, in this embodiment, an abnormal frame is determined on the basis of the film characteristic data on one film or a series of films and the film characteristic data on the film to be printed. For this reason, those print frames which have undergone a color change, due to a photographing light source other than daylight, a change in the color temperature of the photographing light source such as the winter sun and a shade, or a color change due to film characteristics such as variations in the image data, can be accurately distinguished as abnormal films.

In this embodiment, the image data on the print frame may be determined by determining the characteristic amount of the image as in the first embodiment.

Although in the above-described embodiment the characteristic amount of the image is calculated or the densities are determined by selecting pixels of the original image and using the selected pixels, the present invention is not limited to the selection of pixels. For instance, the data itself which is obtained by photometrically measuring the original image may be stored in the memory (third memory), and the exposure amount may be determined on the basis of the stored image data and the film characteristic data (first memory) obtained from the reference image. The effect of the kind of subject on the image data stored in the third memory in this case is large. Accordingly, the degree of deviation of the characteristics of the film to be printed from the characteristics of an average film can be detected on the basis of the film characteristic data obtained from the reference image and the image data obtained by photometrically measuring the original image or the image data on the print frame. Hence, if the color correction coefficients are set in correspondence with this degree of deviation, it is possible to print the original image by preventing color failure irrespective of the kind of subject.

In addition, although in the above-described embodiment the selection of pixels is effected on the basis of image data, the present invention is not limited to the same. For instance, the pixels may be selected by using at least one of the film characteristic data obtained from the reference image (first memory) and the film characteristic data on a multiplicity of films stored for each film type (second memory). Since this film characteristic data is based on data obtained by photometrically measuring the reference image which was not recorded with the light source used at the time of photographing or by the light transmitted through the lens system of the photographing apparatus, it is preferable to use the film characteristic data after being transformed into data in a state in which gray is photographed substantially in daylight by imparting predetermined coefficients thereto. In addition, when the reference image is recorded, it is preferable to adjust the spectral distribution such that the exposing light substantially matches the daylight transmitted through the lens system of the photographing apparatus.

In addition, although in the above-described embodiment image data is accumulated and the accumulated image data is used in the selection of pixels or in the determination of the exposure amount, the present invention is not limited to the same, and only image data based on photometry may be used. As described above, the selection of pixels can be effected on the basis of the film characteristic data, the film characteristic data corresponding to a film type, or image data. In the case where the spectral distribution of the light for recording the reference image is adjusted such that the exposing light substantially matches the daylight transmitted through the lens system of the photographing apparatus, even if the film characteristics have changed, the film characteristic data, as compared with the image data based on photometry, is easily capable of locating a color corresponding to the color of the subject, and is therefore capable of selecting pixels more accurately. Since the film characteristic data corresponding to a film type is average data on the film characteristic data on that film type, the film characteristic data makes it possible to select pixels more accurately than the image data having a high possibility that a deviation in color or the like has occurred. Accordingly, if the exposure-calculating formula is determined (i.e., the aforementioned coefficients are determined) on the basis of at least two items of data among the film characteristic data, film characteristic data corresponding to a film type, and image data, and if the exposure amount is determined by using the film characteristic data and the image data on the print frame, it is possible to print the original image while preventing color failure irrespective of the kind of subject.

Table 1 shows changes of film characteristics which are possible through combinations of data for determining an abnormal frame or an abnormal film in the above-described embodiments.

TABLE 1

| Comparison | Stored for extended period in unexposed state | Stored for extended period in the form of latent image | Photographing light source | Variations in film characteristics including variations in development | Variations in film characteristic data / difference | Variations in image data / difference |
|---|---|---|---|---|---|---|
| 1st film characteristics and 2nd film characteristics | ● | | | ● | ● | |
| 1st film characteristics and 3rd image data | | ● | ● | | | ▲ |
| 1st film characteristics and 4th image data | ▲ | | | ▲ | ▲ | |
| 2nd film characteristics and 3rd image data | ● | ● | ● | ● | | |
| 2nd film characteristics and | | ▲ | ▲ | | ● | ● |

TABLE 1-continued

| Comparison | Stored for extended period in unexposed state | Stored for extended period in the form of latent image | Photograph-ing light source | Variations in film character-istics including variations in development | Variations in film character-istic data / difference | Variations in image data / difference |
|---|---|---|---|---|---|---|
| 4th image data 1st film characteristics and image data on print frame |  | ▲ | ▲ |  |  |  |
| 2nd film characteristics and image data on print frame | ▲ | ▲ | ▲ |  |  |  |

Legends:
●: Difference is noted
▲: Qualitatively distinguishable

In the above-described embodiment, as for the image data stored in the third memory, photometry may be performed by advancing the print frames until necessary accuracy is obtained, and the negative film may be subsequently returned up to the initial print frame. As a similar technique, it is possible to use the method disclosed in Japanese Patent Application Laid-Open No. 159534/1992. In addition, in a case where data is stored in the first memory while prints are being consecutively produced, only the sets of photomeric data on that original image are provided for the first print frame. Accordingly, it is preferable to multiply the amount for determination ΔRGB by a comparison value (Krgb) and by changing the comparison value in accordance with the number of sets of data stored in the first memory. As an example of calculation of the comparison value, it is possible to adopt Krgb=0.15 −(number of sets)/10000. However, the comparison value in this case is set such that Krgb≧0.10. This comparison value may be determined from statistical data on the difference between the data stored in the third memory and the data stored in the fourth memory. For instance, the comparison value can be determined by using a standard deviation of a histogram on the difference between the data stored in the third memory and the data stored in the fourth memory.

Incidentally, although in the above embodiment a description has been given of the case where the first direction and the second direction are opposite, in the case of an apparatus in which the interval between a photometrically measuring section and an exposing section substantially corresponds to the length of one film, the first direction and the second direction may be set in the same direction.

In addition, in the present invention, in a case where the overall surface of the negative film is coated with a transparent magnetic layer, and magnetic information is recorded in this magnetic layer, an arrangement may be provided such that the magnetically recorded information is read in the step of transport in the first direction during simultaneous printing, and density-correction-amount information including a manual correction is recorded or color-correction-amount information may be additionally recorded in the step of transport in the second direction during simultaneous printing.

If information is recorded in the above-described manner, in the case of a reorder, the correction-amount recorded on the film in the step of transport in the first direction is read to determine the presence or absence of the correction amount. If the correction-amount information has been recorded, the correction-amount information is rearranged in such a manner as to allow the recorded correction-amount information to correspond to each frame, and photometry is carried out. In the step of transport in the second direction, a basic exposure amount is calculated, and an exposure amount is determined by adding the correction amount which has been read to the basic exposure amount. On this basis of this exposure amount, a print is produced. In addition, in this case, the exposure amount is calculated on the basis of photomeric data determined by scanning, a comparison is made between the result of calculation and the correction amount, and the exposure amount or the correction amount may be selected to produce a print. Incidentally, the manual correction amount or the correction information including the manual correction amount may be stored at the top of the film or at a last leader.

As described above, in accordance with a first aspect of the present invention, since an exposure calculating formula is determined by using the stored film characteristic data, or film characteristic data and image data, there is an advantage in that the exposure amount can be determined by taking into consideration the characteristics of the film itself, such as the deterioration over time or by taking into consideration gray or a fixed hue close to gray, making it possible to constantly obtain a high-quality print irrespective of a change in the film characteristics such as deterioration over time.

In accordance with a second aspect of the present invention, since the exposure amount is determined by using the film characteristic data and image data on a plurality of original images, an advantage is offered in that the exposure amount can be determined easily even in the case of a film having different characteristics from those of general films.

In accordance with a third aspect of the present invention, the exposure amount is determined by using at least two items of data, including film characteristic data obtained by photometrically measuring the reference image recorded on the film and film characteristic data obtained from a multiplicity of films of the same film type as well as image data on a multiplicity of frames included in the film and image data on a multiplicity of images of the same film type. Accordingly, an advantage is offered in that it is possible to take into consideration the color balance of the film itself including the original image to be printed or the tendency of a color balance peculiar to the same film type, or the color balance concerning the image on the film including the original image to be printed or the tendency of a standard color balance of the same film type, thereby making it possible to constantly obtain a high-quality print irrespective of a change in the film characteristics.

In accordance with a fourth aspect of the present invention, since the exposure amount is determined by using image data generated by the image-data generating means, it is possible to obtain an advantage in that a high-quality print can always be obtained by taking the original image to be printed into consideration irrespective of a change in the film characteristics.

Accordingly, in accordance with first to seventh aspects of the present invention, those negative films whose film characteristics have changed and deteriorated over time during their storage, due to such as the expiration of the effective period, fading of the latent image, being left for extended periods at a high temperature or under high humidity, and fogging by radioactive rays, can be accurately distinguished as abnormal films having characteristics different from those of a multiplicity of films. In addition, it is possible to accurately distinguish those films having film characteristics different from those of a multiplicity of films, due to the use of a photographing light source other than daylight, a change in the color temperature of the photographing light source such as the winter sun and a shade, variations in the lot or manufacture, or variations in development processing. Accordingly, it is possible to determine satisfactory color correction values, and the exposure amount can be determined satisfactorily with respect to all the films, making it possible to produce high-quality prints. In addition, it is possible to produce high-quality prints of uniform print quality in one film, within a series of films, or among films. Consequently, it is possible to obtain an outstanding advantage in that high-quality prints can always be obtained.

Next, a description will be given of a sixth embodiment of the present invention. In the sixth embodiment, the third memory and the fourth memory in the photometric data memory 30 shown in FIG. 1 are combined to constitute the image-data storage means. It should be noted that the third memory is not necessarily required.

Figure 14A:
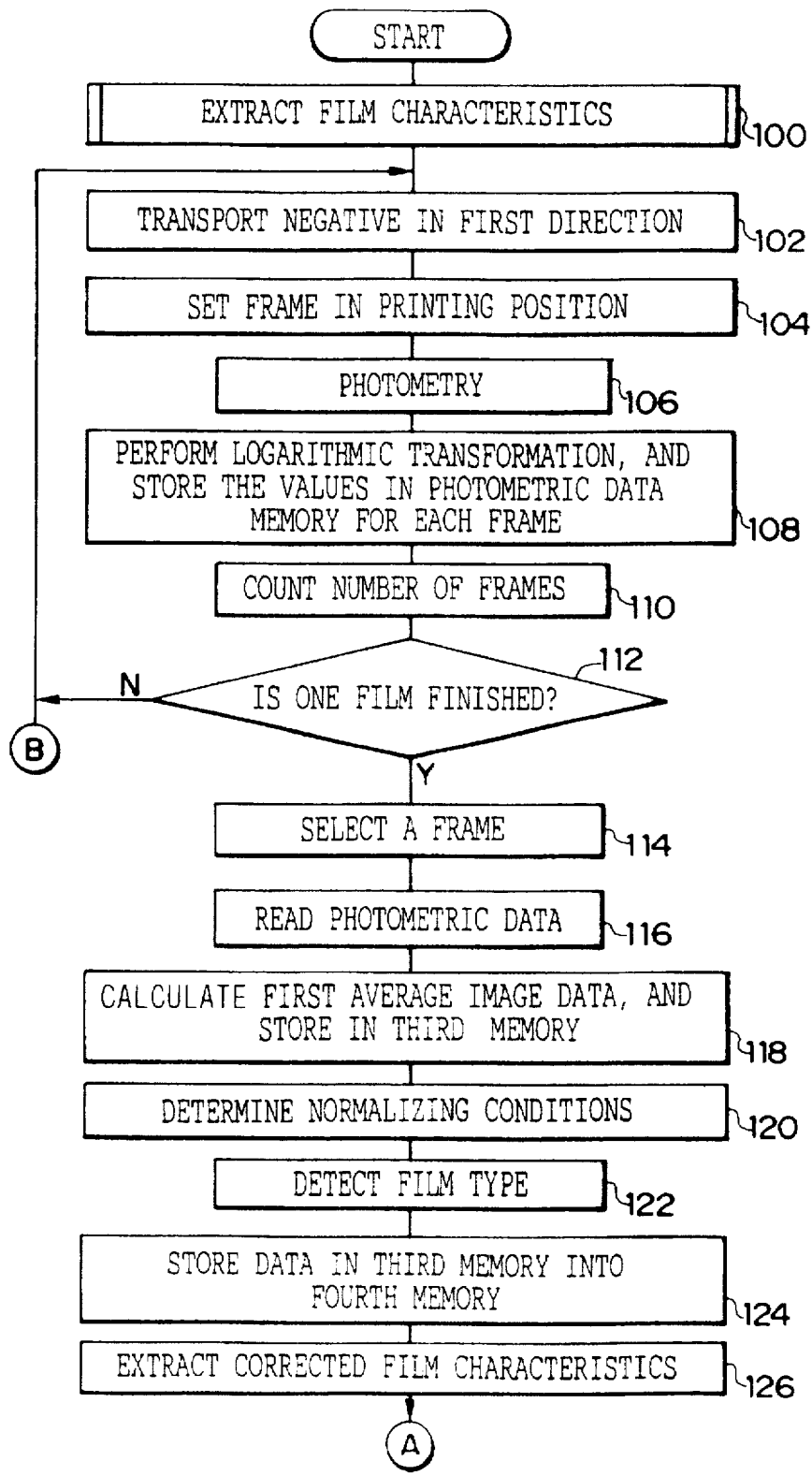
FIGS. 14A and 14B are flowcharts illustrating an exposure control routine in accordance with a sixth embodiment.
Figure 14B:
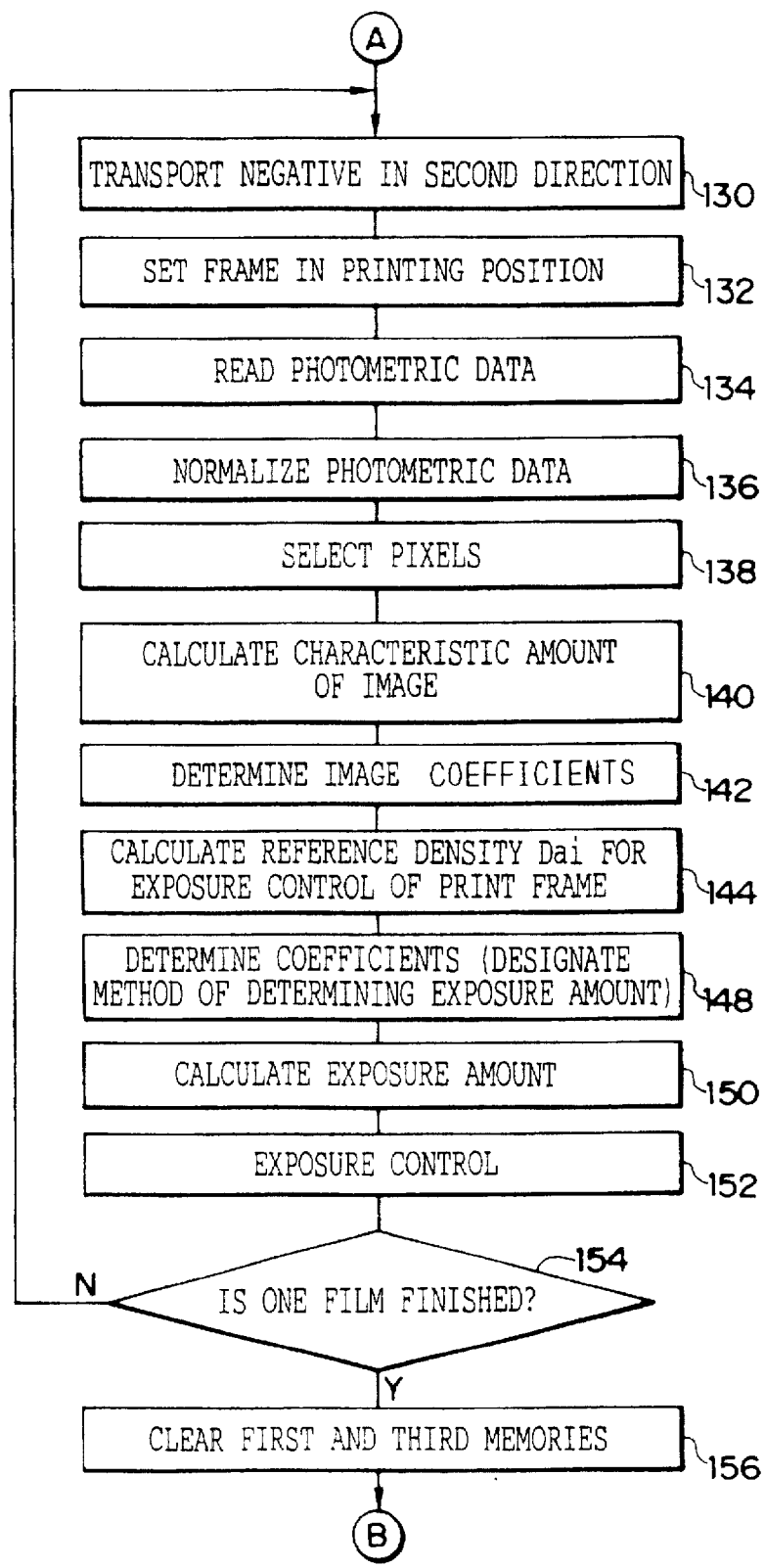

Referring to FIGS. 14A, 14B, and 3, a description will be given of an exposure control routine in accordance with the sixth embodiment. When the negative film 20 is loaded in the negative carrier 21, and a start switch is turned on, in Step 100 in FIG. 14A, the film characteristic data on the negative film 20 loaded in the negative carrier 21 is extracted. In Step 100, a film-characteristic extracting routine shown in FIG. 3 is executed. In Step 202 in FIG. 3, the negative carrier 21 is driven to transport the negative film, a predetermined number of frames (e.g., the number of photographed frames +1 or 0) is counted by detecting the notches by means of the detector, and a frame for the reference image is set in a printing position. In an ensuing Step 204, the reference image in the frame set in the printing position is divided into a multiplicity of pixels by the scanner 28, and photometry is conducted with respect to the pixels for each color of R, G, and B, and the photometric values concerning all the pixels are subjected to logarithmic transformation. By using these logarithmically transformed values of the photometric values, film characteristic data is extracted in an ensuing Step 206.

A description will be given by citing as an example the reference image shown in FIG. 8A. The regions H1 and H2 which are image portions of the reference image are set, and the density of one density step (a region having a fixed density in each region H1, H2) is determined. This density can be determined by determining the density of a central portion of one density step or from an average density of a plurality of pixels in the vicinity of the center. The film characteristic data is extracted from a plurality of densities thus determined. As shown in FIG. 9A, the film characteristic data can be extracted by determining the densities of R and B with respect to the density of G in each density step, and by connecting (interpolating) the respective densities for each color. In addition, as shown in FIG. 9B, the film characteristic data may be extracted by determining the relationship between the density (or the logarithm of the exposure amount) of each density step and the densities of the three colors. Further, in a case where the tricolor average density of the negative film is detected, as shown in FIG. 10A, the color balance may be set as the film characteristic data by determining the values of corresponding color differences B–G and R–G in each step. Furthermore, as shown in FIG. 10B, the film characteristic data may be determined from color differences B–G and G–B.

The extracted film characteristic data is stored in the first memory of the photometric data memory 30 in an ensuing Step 208, and is accumulated in the second memory in an ensuing Step 210.

When the film characteristic data is stored in the photometric data memory 30, if a plurality of reference images are present in one film or a series of films, any one item of the film characteristic data may be stored in the first memory, or its average value may be stored therein. In addition, the individual film characteristic data may be stored separately in the second memory without being accumulated.

Figures 17A, 17B, 17C, 17D:
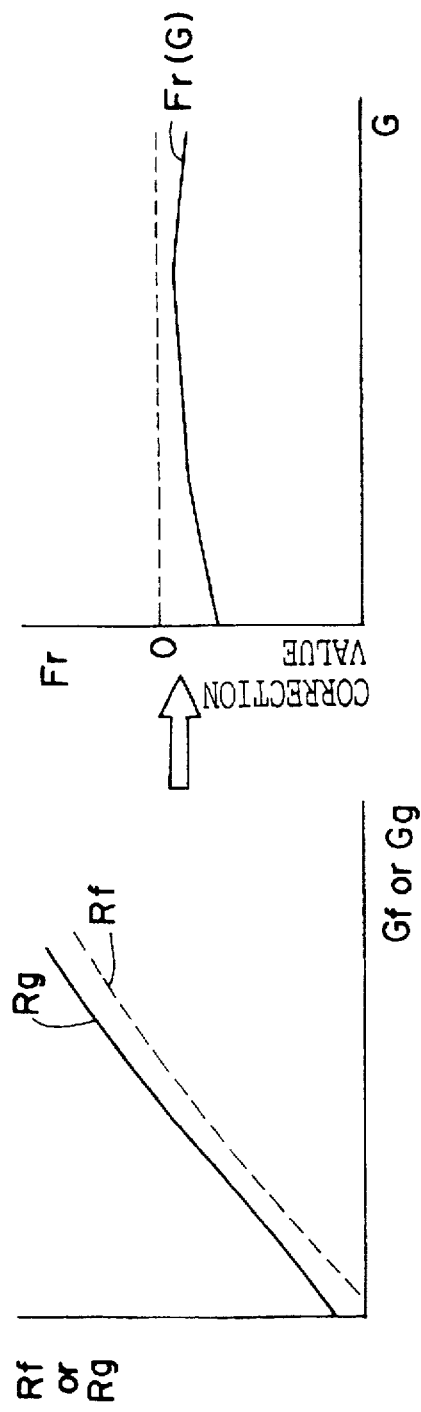
FIGS. 17A, 17B, 17C, and 17D are diagrams illustrating the relationship on the densities of film characteristic data.

In addition, as for the storage of the film characteristic data, as shown in FIG. 17A, it is possible to use an added value as a density Rf of the R color and a density Bf of the B color with respect to the density Gf of the G color among the film characteristic data. In this case, a value which is divided by the number of additions is used. Alternatively, the film characteristic data may be stored with respect to an average density $\{(Gf+Rf+Bf)/3\}$ as shown in FIG. 17C instead of the density Gf, or the film characteristic data may be stored in correspondence with the exposure amount in the printing apparatus or the density steps of the reference image.

In addition, in the description that follows, the film characteristic data on a multiplicity of films of the same film type is set as the film-type characteristic data. As techniques for accumulating the aforementioned film characteristic data, it is possible to use techniques disclosed in Japanese Patent Application Laid-Open Nos. 267749/1986, 273532/1986, and 144158/1987.

Upon completion of the extraction of the film characteristic data, in Step 102 in FIG. 14A, the negative carrier 21 is driven to transport the negative film in a first direction along the longitudinal direction of the negative film. When a notch is detected by the detector, an initial frame is set in the printing position in Step 104. When the negative film is transported in the first direction, the transport may be started beginning with a leading end of the negative film or a trailing end of the negative film. Further, the frame may be set in the printing position by detecting an edge of the frame.

In Step 106, the original image in the frame set in the printing position is divided into a multiplicity of pixels by the scanner 28, and the respective pixels are photometrically measured for each color of R, G, and B. In Step 108, all the sets of photometric values (photometric values for all the pixels) are subjected to logarithmic transformation, and the logarithmically transformed values of the photometric values are stored in the photomeric data memory 30 for each frame as the sets of photometric data. When the photometric data is stored in the photomeric data memory 30, the photomeric data R, G, and B of the frames are stored in accordance with a predetermined arrangement. In this case, the photomeric data on R, G, and B may be stored as it is, or may be stored by performing data compression to reduce the memory capacity. Thus, sets of photomeric data R, G, and B are stored in the photomeric data memory 30 for each frame.

In an ensuing Step 110, the number of photometrically measured frames is counted. In Step 112, a determination is made from the count value as to whether or not the photometry of one negative film has been completed. If the photometry of one negative film has not been completed, the operation returns to Step 102 to transport the negative film by one frame portion in the first direction, and photometry and the storage of sets of photomeric data are repeated. Thus, the sets of photomeric data on the respective three colors R, G, and B for one negative film are set for each frame, i.e., the sets of photometric data on the original images of all the frames at least subject to copying are stored in the memory.

In Step 114, a plurality of frames are selected for calculating the first average image data on a plurality of original images including the original images of frames to be printed. In Step 116, the sets of photomeric data on the selected frames are read from the memory, and in Step 118 the first average image data is calculated. This first average image data is stored in the third memory. Incidentally, the sets of the photomeric data on the selected frames may be stored in the third memory.

This first average image data is data corresponding to at least the film characteristic data. For example, it is possible to adopt the respective average color densities or average color-density differences (e.g., R–G, G–B) determined from the sets of photomeric data on the plurality of original images including the original images of frames to be printed with respect to the density of one color (e.g., G density) or a tricolor average density ((R+G+B)/3). Further, a functional formula or a table value prepared from the sets of photomeric data may be used.

The first average image data on the plurality of original images including the original images of frames (print frames) to be printed can be calculated by selecting all the frames of one film, and by performing calculation on the basis of the sets of photomeric data on the plurality of original images of the film.

However, the first average image data may not necessarily be calculated from the sets of photomeric data on all the frames of one film. After the negative film is transported in the first direction and the photometry and the storage of the sets of photomeric data are completed, the number of all the frames of one film can be determined. Therefore, an arrangement may be provided such that frames in a number corresponding to the number of all the frames of one film are selected, and if the number of frames is 36, either frame of every two frames is selected to calculate the first average image data.

In addition, the selection of frames may be carried out, i.e., the sets of photomeric data may be selected, such that if it is determined that a certain frame deviates substantially from the first average image data on one film, the sets of photomeric data on the deviating frame are not used in the calculation of the first average image data. Further, even in a case where a certain frame is to be excluded from the object to be copied as a result of analysis of the photomeric data on the frame, the sets of photomeric data on the frame may be used in the calculation of the first average image data in compliance with the result of selection of frames.

Incidentally, the first average image data calculated in Step 118 may be determined on the basis of the sets of photomeric data on the original images of a multiplicity of frames of a multiplicity of films for each type of film stored in the fourth memory, or on the basis of image data determined from the sets of such photometric data. In this case, it is possible to adopt as the image data the color characteristics with respect to the sets of photometric data or values determined from density values, e.g., the density of one color (e.g., G density) or a tricolor average density ((R+G+B)/3). As the color characteristics, it is possible to adopt the respective average color densities or average color density differences (e.g., R–G, G–B) determined from the sets of photomeric data on a plurality of original images. Further, a functional formula or a table value prepared from the sets of photomeric data may be used as the image data.

In an ensuing Step 120, normalizing conditions for normalizing the sets of photomeric data are determined as will be described later. In an ensuing Step 122, the type of negative film is detected on the basis of the DX code detected by the detector 52. In an ensuing Step 124, the sets of photomeric data on all the frames at least subject to copying and stored in the third memory are stored in the fourth memory in correspondence with the type of film detected in Step 122. Accordingly, a multiplicity of pieces of data on a plurality of or a series of films for each film type are stored in the fourth memory.

Figure 15:
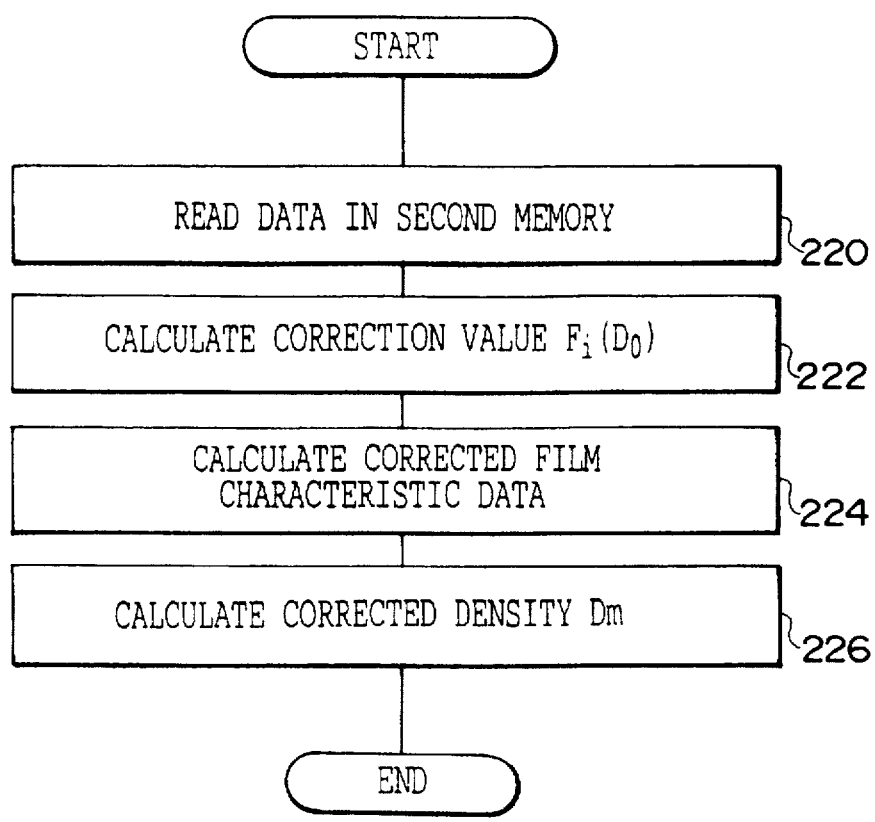
FIG. 15 is a flowchart illustrating a corrected-film-characteristic extracting routine in the present invention.

Next, the corrected film characteristics are extracted in Step 126. In Step 126, a corrected-film-characteristic extracting routine shown in FIG. 15 is executed. In Step 220 in FIG. 15, corresponding film-type characteristic data is read from the second memory, and image data is read from the fourth memory. In an ensuing Step 222, a film-characteristic correction value F is calculated from the following Formula (7):

$$F_i(D_0) = Daf_i - Dap_i \qquad (7)$$

where, $F_i(D_0)$: film-characteristic correction value (the details of which will be described later), and expressed by a functional formula or table of a density $D_0$ such as the G density or the tricolor average density $Daf_i$: film-type characteristic data in the second memory $Dap_i$: image data in the fourth memory corresponding to the film type i: any one color of R, G, and B As for the film-characteristic correction value, in the example shown in FIG. 17A, the difference between, on the one hand, a characteristic (dotted line) expressing a change in the density Rf of the R color with respect to the density Gf of the G color among the film characteristic data and, on the other, a characteristic (solid line) expressing a change in the density Rg of the R color with respect to the density Gg of the G color among the image data, corresponds to a corrected characteristic Fr (G) shown in FIG. 17B.

In addition, in a case where the corrected film characteristics are determined with respect to the average density $D_0$ {(Gf+Rf+Bf)/3} as shown in FIG. 17C instead of the density Gf, the difference between, on the one hand, a characteristic expressing a change in a difference (Rf–Gf) corresponding to the color difference between G and R among the film characteristic data and, on the other, a characteristic expressing a change in a difference (Rg–Gg) corresponding to the color difference between G and R among the image data, corresponds to a corrected characteristic $F_{r-g}(D_0)$ shown in FIG. 17D.

The purpose of determining the film-characteristic correction value is to correct the film characteristic data into a value which matches the image on the negative film in the determination of the exposure amount which will be described later. That is, the film-type characteristic data stored in the second memory is average values of data including the variations and deviations in test exposure apparatuses (exposure apparatuses for generating the reference image ST) and variations in the film developing apparatuses and the photometrically measuring apparatuses. In addition, since the image data on a multiplicity of films stored in the fourth memory is data from the same type of films from which the film-type characteristic data was obtained, the image data is commonly affected by variations in the film characteristics and variations found in the film developing apparatuses and the photometrically measuring apparatuses.

However, the image data on the multiplicity of films represent average values of original images including such as changes in the color temperature due to various photographing light sources, changes in the spectral distribution of photographing light transmitted through the camera lenses, and changes in the color balance due to the fading of the latent image from the time of photographing till development. Incidentally, the effect of the subject can be eliminated by excluding high-saturation points and by using an average of a large volume of data.

Consequently, average image data on one film having the same history as the film including the original image of the print frame is more effective than the film-type characteristic data in the determination of the exposure amount. However, since the average image data on one film is small in terms of the number of pieces of data, such average image data is liable to be affected by the subject, possibly leading to a decline in accuracy. For this reason, by correcting the film characteristic data into a value better adjusted to the film image, it is possible to use the corrected film characteristic data in the accurate determination of the exposure amount.

By using the film-characteristic correction value F calculated as described above, in an ensuing Step 224, the film characteristic data stored in the first memory as the film characteristic data on the film including at least the original image to be printed is corrected in accordance with Formula (8) below, to calculate corrected film characteristic data dF.

$$dF_i = Df_i + F_i(D_0) \qquad (8)$$

where, dF$_i$: corrected film characteristic data

Df$_i$: film characteristic data in the first memory

In an ensuing Step 226, the corrected density Dm is calculated on the basis of the corrected film characteristic data dF thus calculated. As the corrected density Dm, it is possible to use the average density of the tricolor corrected film characteristic data dF$_i$.

Next, in Step 130, the negative film is transported in a second direction opposite to the aforementioned first direction without removing the negative film from the negative carrier, and after detecting a notch the first frame is set in the printing position in Step 132. Incidentally, if a final frame has been positioned in the printing position of the negative carrier, it is unnecessary to transport the negative film in the second direction.

In an ensuing Step 134, the sets of photomeric data on the frame which has been set are read from the memory, and in Step 136 the sets of photomeric data are normalized as follows in accordance with the normalizing conditions determined in Step 120.

First, the sets of tricolor corrected photomeric data are calculated by subtracting the low-density-portion photomeric data from each of the multiplicity of sets of tricolor photomeric data. As the low-density-portion photomeric data, it is possible to use the photomeric data on a reference negative film or a base portion of the film including a film frame. Next, as shown in FIG. 11, the sets of photomeric data on B and R are normalized by being transformed into the density of G by using predetermined normalization curves (or a normalization table), so as to obtain sets of normalized photomeric data on B, R, and G. The reason for normalizing the photomeric data in this way is that since the film density of the negative film varies due to the difference in film type and the difference in development processing, the difference in density is corrected by this normalization, and the photomeric data is transformed by correcting the difference in density means of the normalization, so as to produce a fixed density and color with respect to an identical subject irrespective of the difference in film type and development processing. As methods for this normalization, it is possible to use the methods disclosed in Japanese Patent Application Laid-Open Nos. 1039/1981, 273532/1986, and 144158/1987.

As the film characteristic data stored in the second memory and the image data stored in the fourth memory, a multiplicity of corresponding pieces of data, extracted from the reference image and the original images, are respectively stored, and can be respectively used as average data. For this reason, if these pieces of data are used, it is possible to generate an average transformation formula shown in Formula (9) below or a table of transformation between the film characteristic data and the image data for each film type.

$$FTCD = f(FTPD) \qquad (9)$$

where,

FTCD: film-type characteristic data

FTPD: image data corresponding to the film type

Pixels are selected in an ensuing Step 138, and the characteristic amount of the image is calculated from the selected pixels in Step 140. As the characteristic amount of the image, it is possible to use a maximum density, a minimum density, or an average density of the overall plane or a specific region of the original image, or an average density of a facial region of a human character, or the like. The selection of the pixels corresponds to the extraction of image data on the original image to be printed.

In the selection of pixels, first, as shown in FIG. 12, tricolor normalized data is classified by determining to which color region the tricolor normalized data belongs, among a color region A including the origin, a color region B excluding the color region A and falling in a predetermined range of color difference, and a color region C excluding the color regions A and B, these regions being set on color coordinates with the difference, R–G, between the normalized data R and G taken as the abscissa and the difference, G–B, between the normalized data G and B taken as the ordinate. In accordance with this classification of the tricolor normalized data, the classification of photomeric data, i.e., the classification of pixels, is carried out.

The sets of tricolor normalized data are classified with the boundary between the color regions A and B and the boundary between the color regions B and C serving as lines of demarcation. Hence, the sets of tricolor normalized data are classified into data belonging to a region where the color difference from a reference value (origin) is small, data belonging to a region where the color difference from the reference value is medium, and data belonging to a region where the color difference from the reference value is large. In this embodiment, in Step 138, the photometric data whose normalized data belongs to any one of the color regions A, B, and C, i.e., the pixels, are classified and selected as the photomeric data used in later processing. In addition, in Step 140, the average density of the overall plane or a specific region of the original image is determined for each color (R, G, B), the number of photometric data (pixels) selected after classification and belonging to each region is determined, and the integral density value of photomeric data belonging to each color region is calculated.

As for the technique for selecting the pixels and calculating the characteristic amount of the image in the above-described manner, it is possible to use the method disclosed in Japanese Patent Application Laid-Open Nos. 198144/1986 and 232442/1986, or the like.

In an ensuing Step 142, the image coefficients k1, k2, and k3 are determined from the characteristic amount of the image determined in Step 140 in accordance with the conditions listed below. However, it is assumed that, as for the selected pixels, the number of pixels included in the region A on the color coordinates shown in FIG. 12 is NA, the number of pixels included in the region b is NB, and the number of pixels included in the region C is NC, and that constants $\alpha$ and $\beta$ are determined in advance.

[Conditions]

If NB>NA, and NA>0, then k1≠0, k2=0, k3=0

If NC>$\alpha$, or NA<$\beta$, then k1=0, k2=0, k3=0

If an artificial light source is detected,
then k1=10, k2=10, k3=10

If a light source other than an artificial light source is detected,
then k1>k2, k3=0

As the image coefficients k1, k2, and k3 are determined, in an ensuing Step 144, the reference density $Da_i$ for controlling the exposure of the print frame is calculated in accordance with the following Formula (10):

$$Da_i = (k1 \cdot SDA + k2 \cdot SDB + k3 \cdot SDC)/(k1 \cdot NA + k2 \cdot NB + k3 \cdot NC) \quad (10)$$

where, $Da_i$: reference density

SDA: integral density value of pixels included in the region A

SDB: integral density value of pixels included in the region B

SDC: integral density value of pixels included in the region C

NA: number of pixels included in the region A

NB: number of pixels included in the region B

NC: number of pixels included in the region C

In an ensuing Step 148, a density calculating formula is determined by obtaining the coefficients Ka and Km of the density calculating formula (11) below, and the density $Dp_i$ of the print frame is obtained from the determined density calculating formula. Incidentally, in Step 148, the method of determining the exposure amount, i.e., the selection of a density calculating formula and the number of coefficients, may be determined in response to an input of a printing-method selection signal.

$$Dp_i = Ka \cdot Da_i + Km \cdot Dm \quad (11)$$

where, $Da_i$: reference density for controlling the exposure of a print frame

Dm: value obtained from corrected film characteristic data

Ka, Km: coefficients determined by the type of subject and film characteristic data (where Ka+Km=1.0)

These coefficients Ka and Km are determined as follows. The value in the case of an average print frame or an average film is set as an initial value, and is set in advance such that Ka=Km=0.5.

If there is a difference between the film characteristic data on one film stored in the first memory and the film-type characteristic data which is an average value of a multiplicity of films stored in the second memory, it is assumed that the film is one stored over an extended period or that the film characteristics are erroneous, and the coefficient Km is set to a large value (Km>0.5) depending on the magnitude.

In the case of a frame which has undergone a change over time or in the case of a different kind of light source (e.g., if there is a large difference between the corrected film characteristics and the reference density $Da_i$), the coefficient Km is set to a large value (Km>0.5) depending on the magnitude.

Further, if NC>$\alpha$, or NA<$\beta$ (strong color failure), a setting is provided such that Ka=0.0, and Km=1.0.

In a case where the aforementioned reference density $Da_i$ is determined without excluding high-saturation pixels, pixels which cause color failure are included in the reference density $Da_i$, it is necessary to set the coefficient Ka to a smaller value. If the coefficient Ka is small, it is difficult to correct the effect of the photographing light source, the camera lens, a change in the latent image, and the like. Accordingly, a value approximating Ka=Km=0.5 is set for the normal frame, and the coefficient Km is set to a large value in correspondence with the extent of occurrence of color failure. Although a value in which the high-saturation pixels are excluded is preferably used as the reference density $Da_i$ in cases other than the cases of artificial light sources and frames which have undergone change over time, since the film characteristic data is corrected as described above, it is apparent that this method is also applicable to the case of the reference density $Da_i$ in which the high-saturation pixels have not been excluded.

Then, an exposure amount is determined in accordance with, for example, the exposure calculating formula (12) by using the density $Dp_i$ of the print frame determined in Step 150 above and a reference film density prepared in advance. In Step 152, exposure is effected by controlling the light-adjusting filter 60 in correspondence with the exposure amount thus determined, thereby producing a print. In Step 154, a determination is made as to whether or not the exposure of one film has been completed. If the exposure of one film has not been completed, the operation returns to Step 130 to repeat the above-described processing.

Meanwhile, if the exposure of one film has been completed, in Step 156, the data stored in the first memory and the third memory of the photometric data memory 30 is cleared so as to effect the exposure processing of an ensuing film.

$$Di = Dpi - Dni$$

$$Dw = (\Sigma Di)/3$$

$$\log Ei = Si \cdot \{Ci(Di - Dw) + Dw\} + \gamma \quad (12)$$

where,

Dpi: image density of the print frame

Dni: image density of the reference film

Ci: color correction (=1.0)

Si: slope control value (When Di<0, an under slope coefficient is used; when Di≧0, an over slope coefficient is used)

Ei: exposure amount

γ: value determined by the copying apparatus and the copying material

Incidentally, although a description has been given above of the case where the color regions on the color coordinates in the selection of pixels are classified into three kinds, it goes without saying that the color regions may be further divided into smaller segments. For example, as shown in FIG. 13, the color regions may be further divided by straight lines L1, L2, L3, and L4 with the original set as a visual point on the color coordinates shown in FIG. 12. That is, the color region A in FIG. 12 is further divided into color regions A1, A2, A3, and A4, the color region B into color regions B1, B2, B3, and B4, the color region C into color regions C1, C2, C3, and C4, and the color region D into color regions D1, D2, D3, and D4. The tricolor normalized data is classified by determining to which of these color regions the tricolor normalized data belongs, and the photomeric data is classified (the pixels are classified) in accordance with this classification of the tricolor normalized data. If this procedure is taken, it becomes easy to distinguish a discrepancy between a vivid color of the subject which is liable to cause color failure and a color due to a photographing light source or a change in film characteristics. For example, even if a determination is made that the film was photographed with an artificial light source or the negative film is one which has undergone a change over time, pixels of red and pixels of yellow can be conditionally excluded from the pixels for determining the exposure amount. Hence, it is possible to obtain a high-quality print even with respect to a red or yellow subject. In addition, since color failure differs among subjects in the respective print frames or scenes, it is preferable to process the selection of pixels and the change of weighting coefficients for each print frame in correspondence with the subject and the scene. Further, the values of the aforementioned coefficients k1, k2, and k3 should preferably be selected in accordance with the composition of the subject.

Although in the above-described embodiment the sets of photomeric data are stored for each frame, an arrangement may be provided such that a characteristic amount of the image representing the characteristics of the original image concerning the color characteristics and the density described above is generated from the sets of photomeric data during photometry, and the generated characteristic amount of the image is stored for each frame. Still alternatively, an arrangement may be provided such that the color of each pixel is determined, and the pixels classified on the aforementioned color coordinates (FIG. 12 or the like) concerning the determined color may be selected and stored.

Thus, in this embodiment, the film characteristic data obtained from the reference image stored in the negative film 20 is corrected by the relationship between the film-type characteristic data on the same film type and a multiplicity of pieces of image data corresponding to the film type, and the exposure amount is determined by using the corrected film characteristic data. For this reason, it is readily possible to detect a tricolor density of a standard subject substantially corresponding to gray exhibiting a different density in daylight, without preparing an average daylight source of a spectral distribution, corresponding to daylight which is illuminating light, of the light from the subject accurately transmitted through a camera in a conventional manner. Even in a case where the spectral accuracy of the exposure apparatus for exposing a reference image (gray step image) is low, if the spectral accuracy is stable, such an exposure apparatus can be practically used, and an optimum exposure amount can be determined easily from the film characteristic data obtained. This determined exposure amount becomes a value which is not affected by color failure and in which a change in the film characteristics due to storage over an extended period is corrected.

In addition, even in the case of a negative film in which a difference in film development has occurred, a negative film which has been stored over an extended period, and a negative film which has undergone a change in the film characteristics, it is possible to produce prints with such variations corrected. Further, it is possible to produce prints reflecting the intent of the photographer, such as when producing prints by taking into consideration the effect due to a photographing light source, and when producing prints which are free of color failure. Furthermore, by the input of a printing-method selection signal, it is possible to easily produce prints with a fixed exposure amount and with high quality.

As a result, it is possible to improve the print quality and the rate of prints which can be shipped in unmanned printing, and it is possible to make uniform the print quality within one film or among films.

Next, a description will be given of a seventh embodiment with reference to an exposure control routine shown in FIGS. 16A and 16B. In this embodiment, the pixels of the original image are selected on the basis of corrected film characteristic data in which the data in the first memory, which is the film characteristic data on one film or a series of films including print frames, has been corrected. Since this embodiment is configured substantially in the same way as the foregoing embodiments, identical portions will be denoted by the same reference numerals, and a detailed description thereof will be omitted.

Figure 16A:
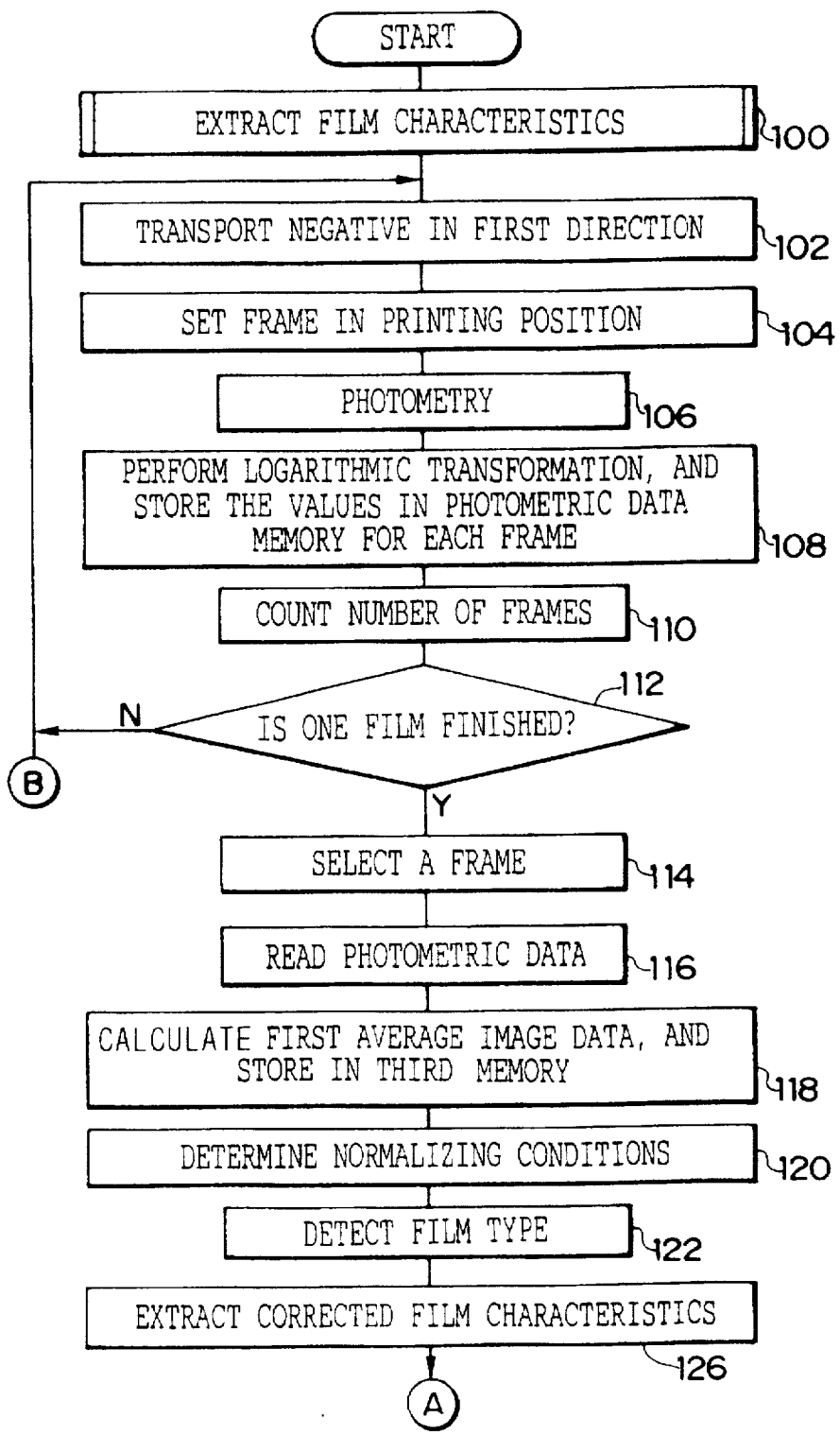
FIGS. 16A and 16B are flowcharts illustrating an exposure control routine in accordance with a seventh embodiment.
Figure 16B:
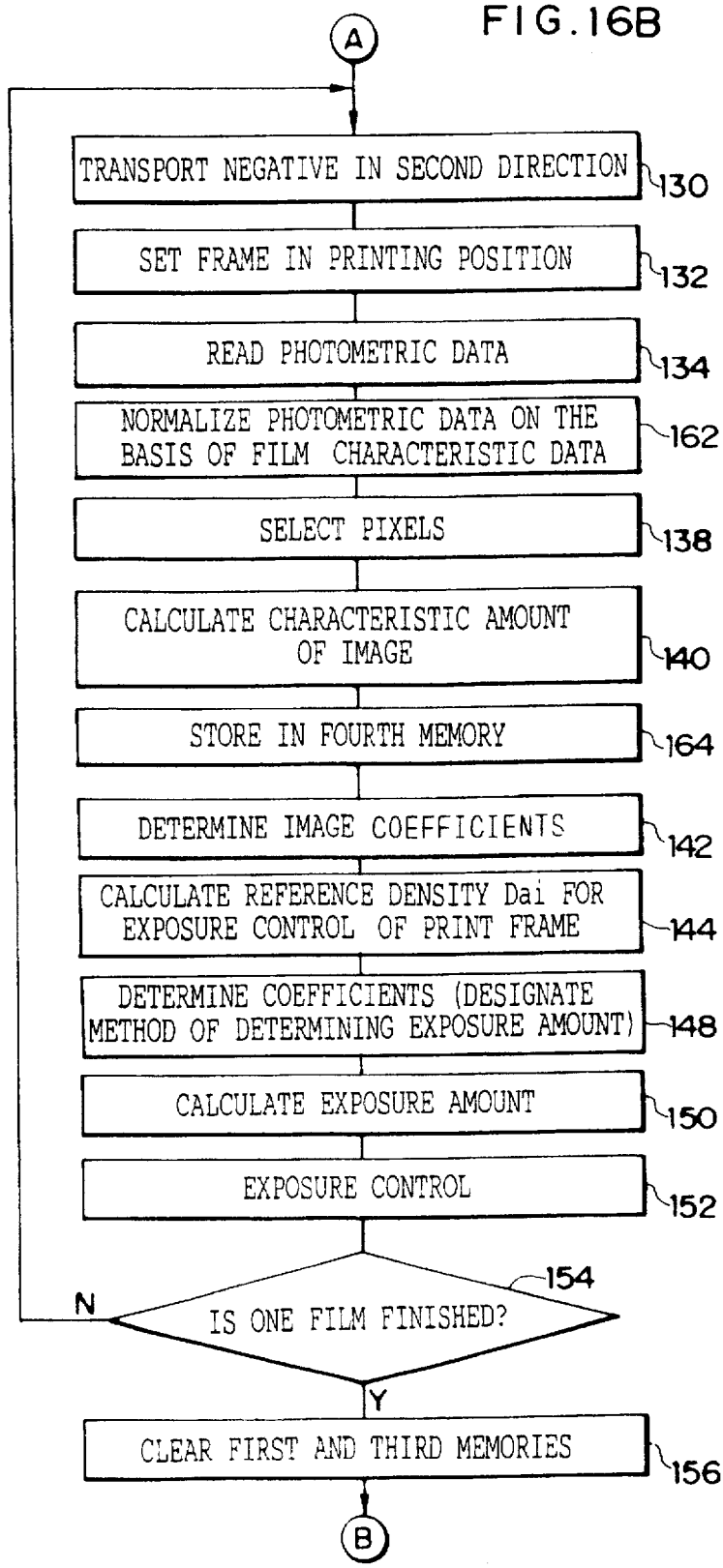

In Step 122 in FIG. 16A, the type of negative film is detected, and then the operation proceeds to Step 126. In Step 126, corrected film characteristics are extracted as described above. Incidentally, in Step 120, the normalizing conditions for normalizing the sets of photomeric data are set on the basis of the corrected film characteristic data. Next, the negative film is transported in the second direction to set a first frame in the printing position, and the sets of photomeric data on the set frame are read from the memory (Steps 130 to 134). In an ensuing Step 162, the sets of photomeric data are normalized as described below in accordance with the normalizing conditions determined in Step 120. In this embodiment, as shown in FIG. 18, a corrected curve of the characteristic (the corrected curve of G–R is shown by the dotted line in FIG. 18) in which the correction value determined above is added is used instead of the normalization curves (or normalization table) shown in FIG. 11.

Figure 18:
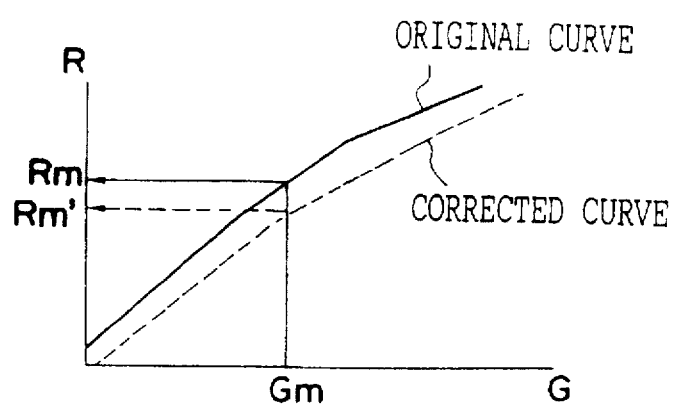
FIG. 18 is a diagram illustrating a corrected curve for normalizing photometric data.

As described in the foregoing embodiment, the sets of tricolor corrected photometric data are calculated, and normalization is carried out by transforming the sets of corrected photometric data on B and R into the density of G by using the corrected curve shown in FIG. 18, so as to determine the sets of normalized photometric data on B, R, and G.

Incidentally, as described in the foregoing embodiment, the normalization may be carried out by transforming the sets of photometric data (image data) into data corresponding to the film characteristic data by using Formula (9) above.

Then, in an ensuing Step 138, the pixels are selected in the same way as in the foregoing embodiment, and in Step 140 the characteristic amount of the image is calculated from the selected pixels. In an ensuing Step 164, the following data are stored in the fourth memory in correspondence with the film type: the average density of the overall plane or a specific region of the original image for each color (R, G, B) on the basis of the selected pixels, the number of photometric data (pixels) selected after classification and belonging to each region, and the integral density value of photomeric data belonging to each color region. Accordingly, data which is comprised of a multiplicity of pieces of data on a plurality of or a series of films for each film type, and which concern pixels selected on the basis of the corrected film characteristic data, is stored in the fourth memory.

Thus, in this embodiment, since the pixels are selected on the basis of image data based on corrected film characteristic data which has been corrected by data stored in the first memory, even in the case of a negative film which has been stored for an extended period, it is possible to accurately estimate the color of the subject by eliminating the film characteristics which have changed due to the storage over an extended period. Accordingly, it is possible to determine the reference density $Da_i$ for controlling the exposure of the print frame on the basis of the pixels selected in accordance with the composition of the subject. Further, it becomes easy to set the magnitudes of the coefficients Ka and Km depending on the degree of extension of the storage period of the film. For this reason, it becomes possible to determine a highly accurate exposure amount which takes into consideration the color composition of the original image, so that high-quality prints can be obtained.

As described above, in accordance with the sixth and seventh embodiments of the present invention, the film characteristic data on the film to be printed is corrected on the basis of a multiplicity of pieces of film characteristic data and image data on the same film type, and the film characteristic data is thereby corrected into values which match the original image of the film. Therefore, it is possible to obtain an advantage in that even if the spectral accuracy of the light for exposing the reference image is not highly accurate, it is possible to readily detect the densities of the three colors of a standard subject substantially corresponding to gray exhibiting a different density in daylight. Further, it is possible to obtain an advantage in that an optimum exposure amount in which changes in film characteristics due to storage over an extended period and other factors are corrected can be determined from the corrected film characteristic data without being affected by color failure.

In addition, the method of determining the exposure amount can be determined by instruction information, so that the exposure with an exposure amount based on the corrected film characteristic data can be selectively carried out. Consequently, it is possible to obtain another advantage in that prints can be produced with a fixed exposure amount and that an optimum exposure amount can be determined from a film photographed intentionally by the photographer.

Accordingly, it is possible to improve the print quality and the production rate of prints which can be shipped in an unmanned printer such as an automatic printer, and it is possible to make uniform the print quality within one film or among films.

What is claimed is:

1. A color copying apparatus comprising:
   photometric measuring means for dividing an original image recorded on one film or a series of films into a multiplicity of pixels and for effecting photometry by color-separating the original image into at least three primary colors;
   extracting means for extracting film characteristic data by photometrically measuring a reference image recorded on a predetermined portion of the film;
   storage means for storing the extracted film characteristic data;
   image-data generating means for generating image data representing a characteristic of the original image on the basis of a photometric value of the original image;
   determining means for determining an exposure calculating formula for determining an exposure amount by using the stored film characteristic data, or film characteristic data and the image data;
   exposure-amount calculating means for determining the exposure amount from the image data on the original image on the basis of the determined exposure calculating formula; and
   exposure controlling means for effecting exposure control on the basis of the exposure amount determined by said exposure-amount calculating means.

2. A color copying apparatus according to claim 1, further comprising:
   pixel selecting means for selecting a pixel of the original image, wherein said image-data generating means generates the image data representing the characteristic of the original image on the basis of the photomeric value of the pixel selected from the original image.

3. A color copying apparatus according to claim 2, wherein said pixel selecting means selects the pixel on the basis of the film characteristic data.

4. A color copying apparatus according to claim 2, wherein said pixel selecting means selects the pixel on the basis of the image data.

5. A color copying apparatus comprising:
   photometric measuring means for dividing an original image recorded on one film or a series of films into a multiplicity of pixels and for effecting photometry by color-separating the original image into at least three primary colors;
   extracting means for extracting film characteristic data by photometrically measuring a reference image recorded on a predetermined portion of the film;
   first storage means for storing the extracted film characteristic data;
   image-data generating means for generating image data representing a characteristic of the original image on the basis of a photometric value of the original image;
   second storage means for storing the image data on a plurality of original images;
   determining means for determining an exposure calculating formula for determining an exposure amount by using the film characteristic data and the image data;
   exposure-amount calculating means for determining the exposure amount from the image data on the original image on the basis of the determined exposure calculating formula; and
   exposure controlling means for effecting exposure control on the basis of the exposure amount determined by said exposure-amount calculating means.

6. A color copying apparatus according to claim 5, further comprising:
   pixel selecting means for selecting a pixel of the original image, wherein said image-data generating means generates the image data representing the characteristic of the original image on the basis of the photomeric value of the pixel selected from the original image.

7. A color copying apparatus according to claim 6, wherein said pixel selecting means selects the pixel on the basis of the film characteristic data.

8. A color copying apparatus according to claim 6, wherein said pixel selecting means selects the pixel on the basis of the image data.

9. A color copying apparatus comprising:

photometric measuring means for dividing an original image recorded on one film or a series of films into a multiplicity of pixels and for effecting photometry by color-separating the original image into at least three primary colors;

extracting means for extracting film characteristic data by photometrically measuring a reference image recorded on a predetermined portion of the film;

first storage means for storing the extracted film characteristic data;

second storage means for storing film characteristic data on a multiplicity of films of the same film type as the film;

image-data generating means for generating image data representing a characteristic of the original image on the basis of a photometric value of the original image;

third storage means for storing the image data on a multiplicity of frames included in the film;

fourth storage means for storing image data on a multiplicity of frames of a multiplicity of films of the same film type as the film;

determining means for determining an exposure calculating formula for determining an exposure amount by using at least two items of data including the film characteristic data stored in said first storage means and said second storage means and the image data stored in said third storage means and said fourth storage means;

exposure-amount calculating means for determining the exposure amount from the image data on the original image on the basis of the determined exposure calculating formula; and exposure controlling means for effecting exposure control on the basis of the exposure amount determined by said exposure-amount calculating means.

10. A color copying apparatus according to claim 9, wherein said determining means determines the exposure amount by using at least two items of data, including the film characteristic data stored in said first storage means and said second storage means and the image data stored in said third storage means and said fourth storage means, as well as the image data generated by said image-data generating means.

11. A color copying apparatus according to claim 9, further comprising:

pixel selecting means for selecting a pixel of the original image, wherein said image-data generating means generates the image data representing the characteristic of the original image on the basis of the photomeric value of the pixel selected from the original image.

12. A color copying apparatus according to claim 11, wherein said pixel selecting means selects the pixel on the basis of the film characteristic data.

13. A color copying apparatus according to claim 11, wherein said pixel selecting means selects the pixel on the basis of the image data.

\* \* \* \* \*